(12) United States Patent
Leung

(10) Patent No.: US 12,114,783 B2
(45) Date of Patent: Oct. 15, 2024

(54) AIR BED HAVING AN IMPROVED BUILT-IN AIR PUMP

(71) Applicant: Belgravia Wood Limited, Tortola (VG)

(72) Inventor: Chi Yin Alan Leung, Hong Kong (CN)

(73) Assignee: Belgravia Wood Limited, Tortola (VG)

( * ) Notice: Subject to any disclaimer, the term of this patent is extended or adjusted under 35 U.S.C. 154(b) by 382 days.

(21) Appl. No.: 17/618,142

(22) PCT Filed: Jun. 12, 2020

(86) PCT No.: PCT/US2020/037516
§ 371 (c)(1),
(2) Date: Dec. 10, 2021

(87) PCT Pub. No.: WO2020/252327
PCT Pub. Date: Dec. 17, 2020

(65) Prior Publication Data
US 2022/0232993 A1 Jul. 28, 2022

(30) Foreign Application Priority Data
Jun. 12, 2019 (CN) .......................... 201920877629.2

(51) Int. Cl.
*A47C 27/08* (2006.01)
*A47C 27/00* (2006.01)

(52) U.S. Cl.
CPC .......... *A47C 27/081* (2013.01); *A47C 27/087* (2013.01); *A47C 27/08* (2013.01)

(58) Field of Classification Search
CPC ..... A47C 27/081; A47C 27/08; A47C 27/082; A47C 27/087
(Continued)

(56) References Cited

U.S. PATENT DOCUMENTS 5,827,052 A 10/1998 Wang
6,722,306 B1 * 4/2004 Wang ..................... F04B 33/00
441/40
(Continued)

FOREIGN PATENT DOCUMENTS

CA 2929485 A1 * 11/2016 .......... A47C 27/081
CA 3140976 A1 * 11/2016
(Continued)

*Primary Examiner* — Robert G Santos
(74) *Attorney, Agent, or Firm* — Troutman Pepper Hamilton Sanders LLP; Ryan A. Schneider; Christopher C. Close, Jr.

(57) ABSTRACT

Disclosed herein is a valve assembly disposed on a top surface of an air mattress and connected to a built-in air pump. The built-in air pump can comprise: a tube-like construction defining an inner cavity between the top surface and the bottom surface; a compression spring located within the inner cavity and attached to the top surface and the bottom surface; a bellow connected to a side surface of the tube-like construction, the bellow providing an air pathway from the inner cavity to the interior volume of the air mattress; a top end cap attached to a top portion of the compression spring and abutting the top surface; and a bottom end cap attached to a bottom portion of the compression spring and abutting the bottom surface.

27 Claims, 14 Drawing Sheets

(58) Field of Classification Search
USPC .................. 5/706, 711, 712, 644, 654, 655.3
See application file for complete search history.

(56) References Cited

U.S. PATENT DOCUMENTS

| | | | |
|---|---|---|---|
| 9,949,572 B2* | 4/2018 | Ocegueda Gallaga | ...................... A47C 27/087 |
| 10,327,563 B2* | 6/2019 | Ocegueda Gallaga | ...................... A47C 27/087 |
| 10,455,949 B2* | 10/2019 | Ocegueda Gallaga | ...................... A47C 27/087 |
| 11,330,914 B2* | 5/2022 | Ocegueda Gallaga | ...................... B29C 66/433 |
| 2008/0047072 A1 | 2/2008 | Chang et al. | |
| 2011/0162725 A1 | 7/2011 | Chaffee | |
| 2012/0000017 A1 | 1/2012 | Xia et al. | |
| 2016/0331148 A1 | 11/2016 | Ocegueda Gallaga et al. | |
| 2016/0331149 A1* | 11/2016 | Ocegueda Gallaga | ...................... A47C 27/087 |
| 2019/0223617 A1* | 7/2019 | Ocegueda Gallaga | ...................... A47C 27/087 |
| 2020/0187668 A1* | 6/2020 | Ocegueda Gallaga | ...................... A47C 27/087 |
| 2022/0125213 A1* | 4/2022 | Ocegueda Gallaga | ...................... F16K 15/202 |
| 2022/0232993 A1* | 7/2022 | Leung | .................. A47C 27/082 |
| 2022/0273116 A1* | 9/2022 | Ocegueda Gallaga | ...................... A47C 27/081 |

FOREIGN PATENT DOCUMENTS

| | | | | | |
|---|---|---|---|---|---|
| CA | 3127929 A1 | * | 7/2020 | ........... | A47C 27/081 |
| CA | 2929485 C | * | 1/2022 | ........... | A47C 27/081 |
| CA | 3140976 C | * | 7/2023 | | |
| GB | 708759 A | | 5/1954 | | |
| WO | WO-2020128924 A1 | * | 6/2020 | ........... | A47C 27/081 |
| WO | WO-2020154711 A1 | * | 7/2020 | ........... | A47C 27/081 |
| WO | WO-2020252327 A1 | * | 12/2020 | ........... | A47C 27/081 |

* cited by examiner

AIR BED HAVING AN IMPROVED BUILT-IN AIR PUMP

CROSS-REFERENCE TO RELATED APPLICATIONS

This application is a national stage application, filed under 35 U.S.C. § 371, of International Patent Application No. PCT/US2020/037516, filed on 12 Jun. 2020, which claims benefit under 35 U.S.C. § 119(a), of Chinese Patent App. No. 2019208776292, filed 12 Jun. 2019, the entire contents and substance of which are incorporated herein by reference in their entirety.

FIELD OF THE INVENTION

The presently disclosed subject matter relates generally to airbed systems, particularly valves for airbed systems capable of fitting various pump sizes and/or reducing manual pumping.

BACKGROUND

Conventional airbeds, or air mattresses, as they are commonly referred, typically are used in lieu of traditional box-spring mattresses, memory foam mattresses, water beds, and other beds as temporary structures for sleeping. Generally, air mattresses comprise a soft and flexible material chamber with an air-tight seal that allows the air mattress to inflate during use and deflate after use. Typically, airbeds comprise an internal structure or tensioning structure that helps the airbed achieve its intended shape once the airbed is inflated. The internal structure also prevents the airbed from over-inflating.

Many air mattresses are inflated with external air pumps, including manual and electric air pumps. External manual air pumps inflate slowly and require varying amounts of manual labor. Meanwhile, external electric air pumps provide quick inflation and require little to no manual labor. Despite those benefits, all external air pumps require the user to own, borrow, or rent a pump to inflate an air mattress. This may not be ideal in situations where storage is an issue or where multiple air mattresses need to be inflated within the same time period. Air mattresses with built-in air pumps overcome the aforementioned disadvantages while having their own disadvantage, time consuming inflation periods. This occurs because when air mattresses are inflated with a built-in manual air pump, the user must step downward on the pump to inflate the air mattress, remove his foot from the pump, and repeat until the mattress is inflated.

Accordingly, there is a need for an improved air mattress with a built-in air pump capable of faster inflation. Embodiments of the present disclosure are directed to these and other considerations.

SUMMARY

Briefly described, embodiments of the presently disclosed subject matter relate to airbed systems and, in particular, airbed systems having improved valves capable of receiving pumps of various sizes for inflation and/or a built-in air pump capable of easing manual pumping.

Aspects of the present disclosure relate to an air mattress with a built-in air pump capable of inflation without the pump being repeatedly stepped on. In particular, within an internal portion of the air mattress, a built-in manual air pump may be included. The built-in manual air pump may include a tube-like construction having an inner cavity, a compression spring located within the inner cavity of the tube-like construction, a top end cap attached to a top portion of the compression spring, a bottom end cap attached to a bottom portion of the compression spring, and a bellow connected to a side surface of the tube-like construction. The built-in air pump may be connected to a valve assembly. The valve assembly may be attached to a top surface of the air mattress. The valve assembly may include a valve body, a diaphragm valve, a valve cap, and a cap gasket. The diaphragm valve may be positioned at a bottom portion of the valve body. The valve cap may be configured to attach to the valve body. Further, the valve cap may have a hook-like portion. The cap gasket may be positioned within the valve cap.

The valve body may include a flat flange, a wavy top surface, and a cap strap. The flat flange may be connected to the top surface of the air mattress device. The wavy surface may have a side surface providing a connection to the flat flange. The cap strap may be configured to attach to the valve cap at the hook-like portion of the valve cap.

In some embodiments, the tube-like construction may be constructed of flexible plastic sheets. The tube-like construction may be configured to allow air to flow from the bellow to the main air chamber of the mattress. As the air pressure within the air chamber increases, the tube-like construction may be squeezed by the air pressure which allows the tube-like construction to act like a one-way valve, i.e., inhibiting air from exiting the air mattress. The compression spring may act upon the bellow to cause it to contract and/or expand. More specifically, when the compression spring is not pressed (e.g., not stepped on), the bellow may contract. Conversely, when the compression is pressed (e.g., stepped on), the bellow may expand.

According to some embodiments, the wavy surface may allow air to enter the valve surface when covered. The diaphragm valve may be configured to prevent air from entering the valve assembly when the air mattress device is inflated. Alternately, the diaphragm valve may be configured to allow air to enter the valve assembly when the air mattress device is not inflated.

An example embodiment of the present disclosure relates to an air mattress having a valve comprising a top cover, a top ring, a middle valve cover attached to a valve base, a diaphragm, and a bottom ring. According to some embodiments, the middle valve cover comprises an adapter ring configured to attach to the middle valve cover and a default ring configured to attach to the valve cover. The default ring has a different diameter than the adapter ring. The default ring may have a diameter of 31 mm. Further, the default ring may be configured to allow a 31 mm air pump to inflate an air mattress comprising the middle valve cover. The adapter ring may have a diameter of 18 mm. The adapter may be configured to plug into the middle valve. The adapter ring may be removable from the air mattress. Moreover, the adapter ring may be configured to allow an 18 mm air pump to inflate an air mattress comprising the adapter ring. The middle valve cover may have grooves allowing it to be screwed onto the valve base. The diaphragm may allow connection between the valve base and the middle valve cover. The bottom ring may further facilitate connection between the middle valve cover and the valve base. In some embodiments, the middle valve cover may be attached to the valve base by other means known in the art. The top ring and/or bottom ring may be configured to cover at least a portion of the middle valve cover. The top ring may facilitate connection between the top cover and the middle valve cover.

The air mattress may further include an internal structure comprising a sheet connected to the interior surfaces of the top and bottom surfaces of an air mattress. According to some embodiments, the sheet may comprise a single piece of material having a plurality of apertures, forming a mesh (which may be referred to as a "mesh sheet" or "mesh web"). Each of the top and bottom surfaces may comprise a plurality of connection points, and the sheet may be attached to two or more top surface connection points and two or more bottom surface connection points. The sheet may be attached to the top surface and bottom surface in such a manner that it forms a web-like structure or a wavy 3-dimensional sinusoidal shape when the airbed is inflated. The internal structure may help the air mattress maintain its intended geometric shape when inflated. Further, the internal structure may prevent the air mattress from becoming over-inflated. Also, the internal structure may prevent the top and bottom surfaces of the air mattress from shearing (i.e., moving laterally relative to one another) when the air mattress is in use. Also, because such an internal structure is light-weight and adds little to the overall bulk of the air mattress, when deflated, the air mattress can be easily stowed away and transported.

Other embodiments of the present disclosure relate to a valve comprising a top cap configured to attach to a top valve, a middle valve, a top ring, a diaphragm and a bottom ring configured to allow the middle valve to attach to the valve base. According to some embodiments, the middle valve has a different diameter than the top valve. The top valve may have a diameter of 18 mm. Further, the top valve may be configured to allow an 18 mm air pump to inflate an air mattress comprising the middle valve cover. The middle valve may have a diameter of 31 mm. The top valve may be configured to attach to the middle valve. In some embodiments, the top valve and the middle may screw into one another for attachment. The middle valve may be configured to allow a 31 mm air pump to inflate an air mattress. The diaphragm may allow connection between the valve base and the middle valve. The diaphragm may be inserted into a region of the middle valve to allow connection between the valve base and the middle valve. The bottom ring may further facilitate connection between the middle valve and the valve base. In some embodiments, the middle valve may be attached to the valve base by other means known in the art. The top ring and/or bottom ring may be configured to cover at least a portion of the middle valve. The top ring may facilitate connection between the top cover and the middle valve. The top cap may be attached by placing the top cap over the top valve and the middle while the two are connected.

The foregoing summarizes only a few aspects of the presently disclosed subject matter and is not intended to be reflective of the full scope of the presently disclosed subject matter as claimed. Additional features and advantages of the presently disclosed subject matter are set forth in the following description, may be apparent from the description, or may be learned by practicing the presently disclosed subject matter. Moreover, both the foregoing summary and following detailed description are exemplary and explanatory and are intended to provide further explanation of the presently disclosed subject matter as claimed.

BRIEF DESCRIPTION OF THE DRAWINGS

The accompanying drawings, which are incorporated in and constitute a part of this specification, illustrate multiple embodiments of the presently disclosed subject matter and, together with the description, serve to explain the principles of the presently disclosed subject matter; and, furthermore, are not intended in any manner to limit the scope of the presently disclosed subject matter.

DETAILED DESCRIPTION

Figure 1A:
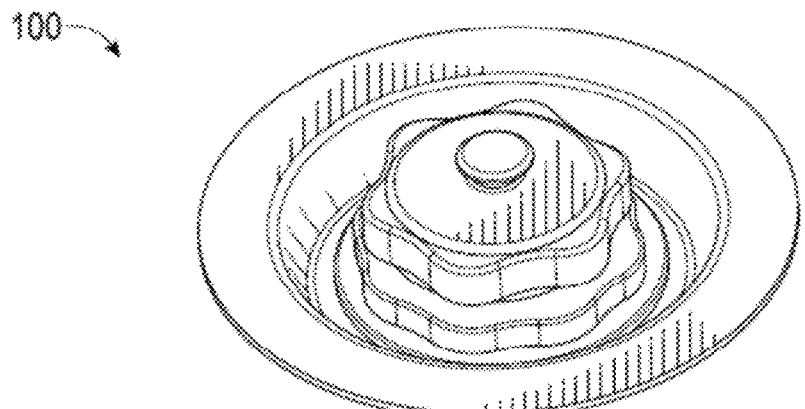
FIG. 1A is a top view of an assembled valve, in accordance with an example embodiment of the presently disclosed subject matter.

Although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

It should also be noted that, as used in the specification and the appended claims, the singular forms "a," "an" and "the" include plural references unless the context clearly dictates otherwise. References to a composition containing "a" constituent is intended to include other constituents in addition to the one named. Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" may be used herein to connote different aspects of methods employed, the term should not be interpreted as implying any particular order among or between various steps herein disclosed unless and except when the order of individual steps is explicitly required.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

Embodiments of the disclosed technology include an airbed mattress having a built-in air pump capable of continuous pumping. In various embodiments, because of the continuous pumping, the built-in air pump may provide an air mattress with the ability to be inflated faster. In some embodiments, the airbed mattress may include a valve capable of receiving multiple pumps of different sizes. Further, because larger pumps can be received, the valve allows for faster inflation. The valve also provides for inflation by automated pumps and hand pumps as the sizes vary accordingly.

Referring now to the figures, wherein like reference numerals represent like parts throughout the views, embodiments of the valve and the internal airbed structure will be described in detail.

FIG. 1A shows a top view of an assembled valve. Valve 100 may comprise various materials. For example, valve 100 and/or its components may be constructed from a combination of plastic, polyvinyl chloride ("PVC"), rubber, metal, or any other suitable material or combination of materials to provide the desired qualities described herein. Further, valve 100 may vary in size and positioning. Valve 100 may be positioned on a top surface, a bottom surface, and/or a side surface of an air mattress. It is further contemplated that an air mattress may comprise a plurality of valves 100.

Figure 1B:
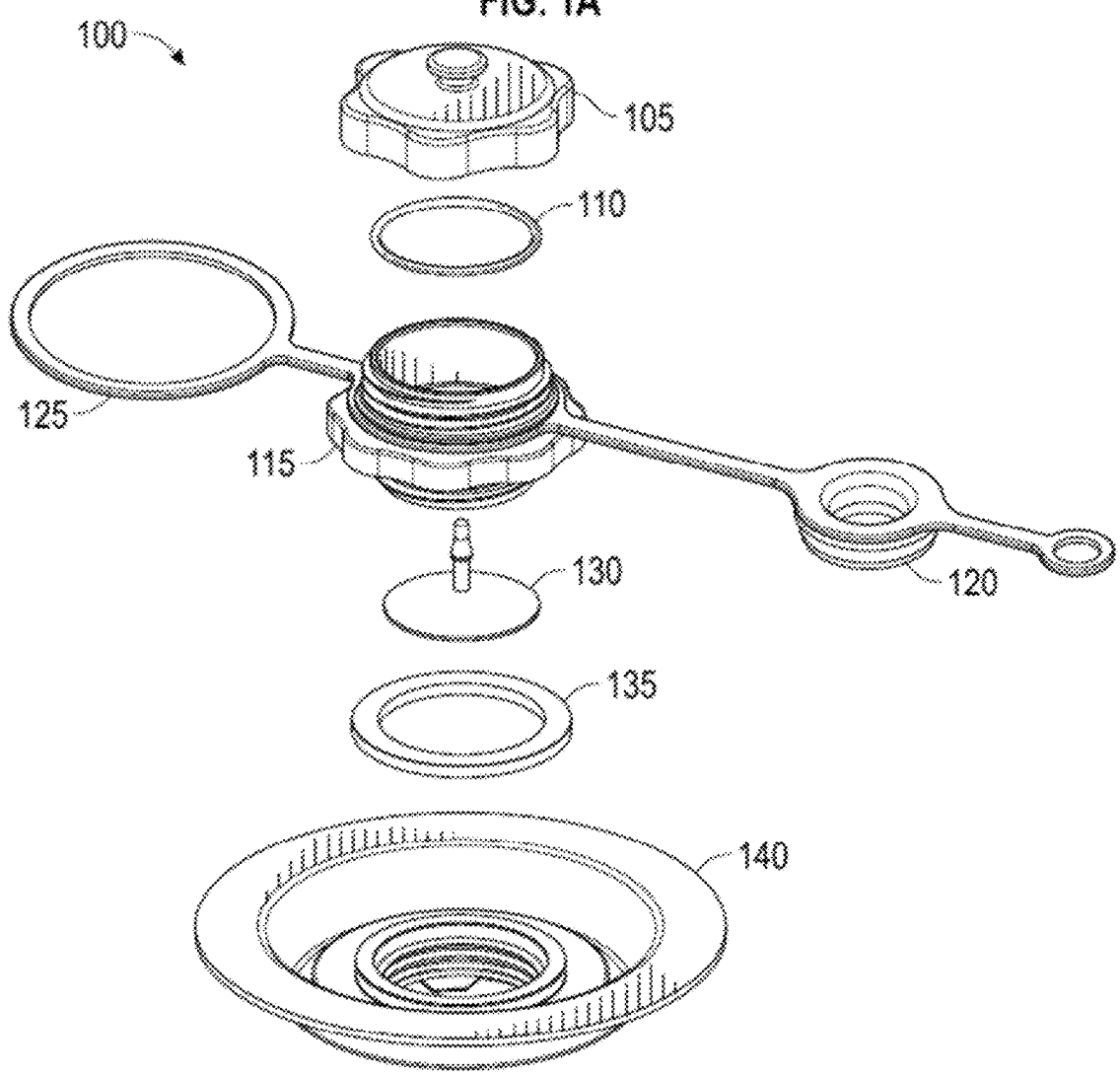
FIG. 1B is an exploded view of components of a valve, in accordance an example embodiment of with the presently disclosed subject matter.

FIG. 1B illustrates an exploded view of components of a valve. The components and arrangements shown in FIG. 1B are not intended to limit the disclosed embodiments as the components used to implement the disclosed processes and features may vary. Valve 100 may include a top cover 105, a top ring 110, a middle valve 115, an adapter ring 120, a default ring 125, a diaphragm 130, a bottom ring 135, and a valve base 140. The top cover 105 may include grooves capable of attachment by a screwing motion. The top cover 105 may attach to the middle valve 115. As part of attaching to middle valve 115, the top cover 105 may envelop at least portion of the middle valve 115. In some embodiments, the top cover 105 may attach to the middle valve 115 by other means known in the art.

The top ring 110 may be inserted between the middle valve 115 and the top cover 105 during attachment. The top ring 110 may reduce friction and/or wear of the middle valve 115 and/or the top cover 105. The middle valve 115 may be connected to the default ring 125 and/or the adapter ring 120. The adapter ring 120 may have grooves allowing attachment to the middle valve 115 through a screwing motion. The adapter ring 120 may have a diameter of 18 mm. As a result, when the adapter ring 120 attaches to the middle valve 125, the adapter ring 120 may allow the valve 100 to fit an air pump having a nozzle size of 18 mm. In some embodiments, the adapter ring 120 may attach to the middle valve 115 by other means known in the art.

The default ring 125 and the adapter ring 120 may be connected to the middle valve 115 by the same connection. The connection may be flexible such that the adapter ring 120 and/or the default ring 125 are able to bend over a top portion of the middle valve 115. When the top cover 105 is disconnected from the middle valve 115, the middle valve 115 is exposed. The middle valve may have a diameter of 31 mm. The default ring 125 may also have a diameter of 31 mm. Accordingly, the middle valve and/or default ring may allow the valve 100 to fit an air pump having a nozzle size of 31 mm.

When the air pressure of the air mattress (e.g., air mattress 400 shown in FIG. 4) is inflated (i.e., the air pressure is near capacity) a top portion of the diaphragm 130 may enter an opening of a bottom portion of the middle valve 115 such that a connection is created. At this point, the connection between the diaphragm 130 and the middle valve 115 provides closure of the air valve, which prevents air from entering or exiting the air mattress 400. Conversely, when the air pressure of the mattress 400 is deflated, space exits between the top portion of the diaphragm 130 and the bottom portion of middle valve 115 such that air may enter the mattress 400 for inflation.

A bottom portion of the diaphragm 130 may positioned within the valve base 140. The bottom ring 135 may be positioned between the valve base 140 and the diaphragm 130. The bottom ring 135 may reduce friction and/or wear of the middle valve 115 and/or the valve base 140.

Figure 1C:
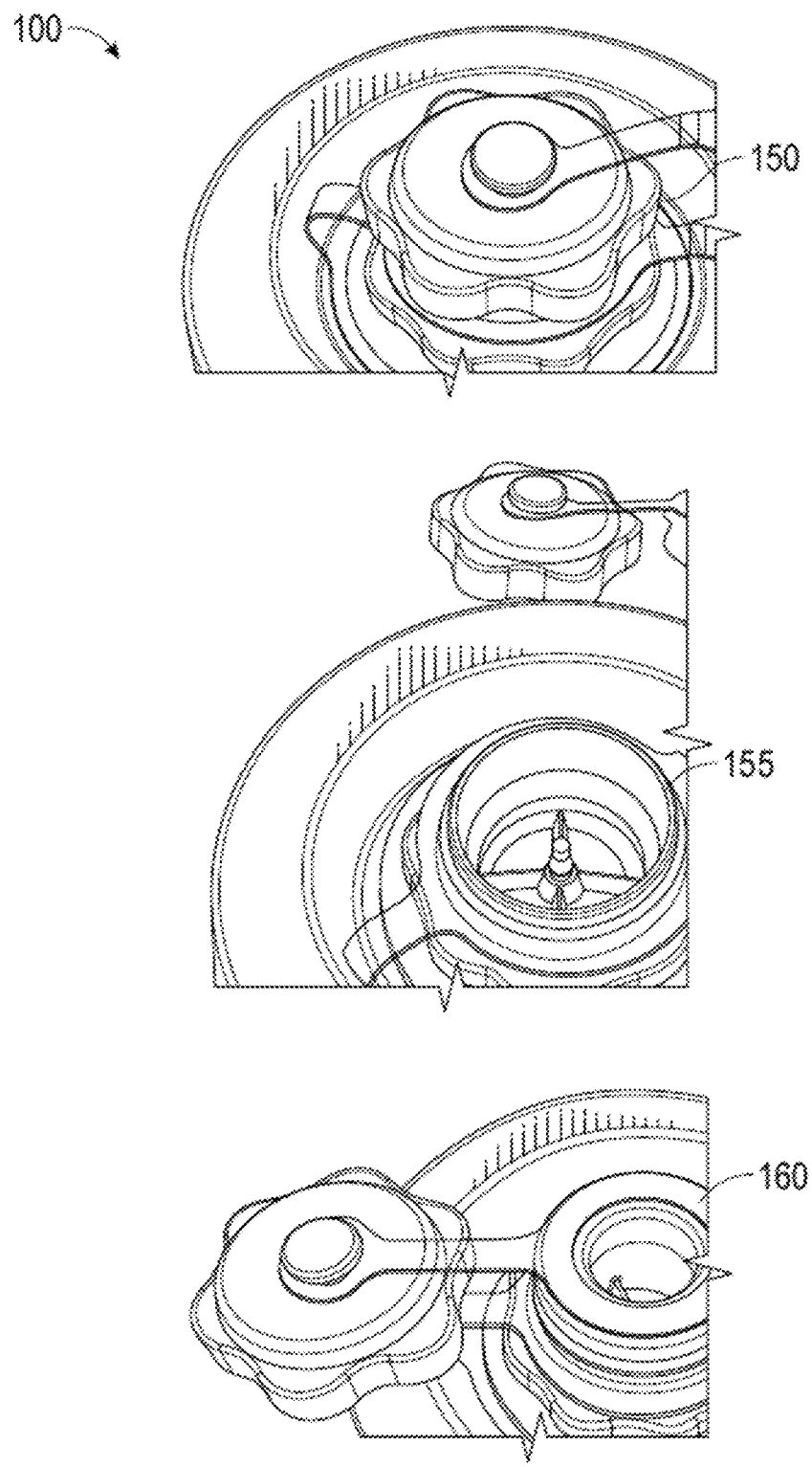
FIG. 1C illustrates stages of assembly of a valve, in accordance with an example embodiment of the presently disclosed subject matter.

FIG. 1C illustrates stages of assembly of a valve. At 150, valve 100 is closed (i.e., the top cover 105 is connected to a top portion of the middle valve 115). At 155, the top cover 105 is disconnected from a top portion of middle valve 115. When the top cover 105 is disconnected from a top portion of the middle valve 115, the middle valve 115 is exposed and therefore, the valve 100 may receive air from an air pump having a diameter of 31 mm. At 160, the top cover 105 is disconnected from a top portion of middle valve 115. However, adapter ring 120 is connected to the middle valve 115. Therefore, the valve 100 may receive air from an air pump having a diameter of 18 mm.

Figure 2A:
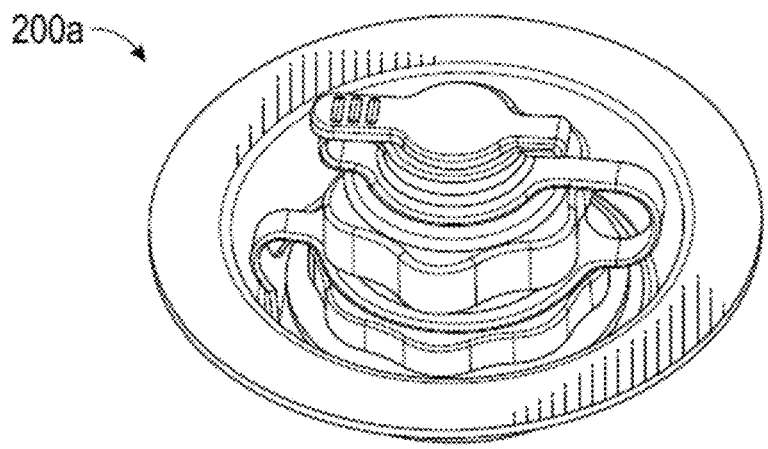
FIG. 2A is a top view of an assembled valve, in accordance with an example embodiment of the presently disclosed subject matter.

FIG. 2A shows a top view of an assembled valve. Similar to valve 100, valve 200 may comprise various materials. For example, valve 200 and/or its components may be constructed from a combination of plastic, polyvinyl chloride ("PVC"), rubber, metal, or any other suitable material or combination of materials to provide the desired qualities described herein. Further, valve 200 may vary in size and positioning. Valve 200 may be positioned on a top surface, bottom surface, and/or a side surface of an air mattress. It is further contemplated that an air mattress may comprise a plurality of valves 200.

Figure 2B:
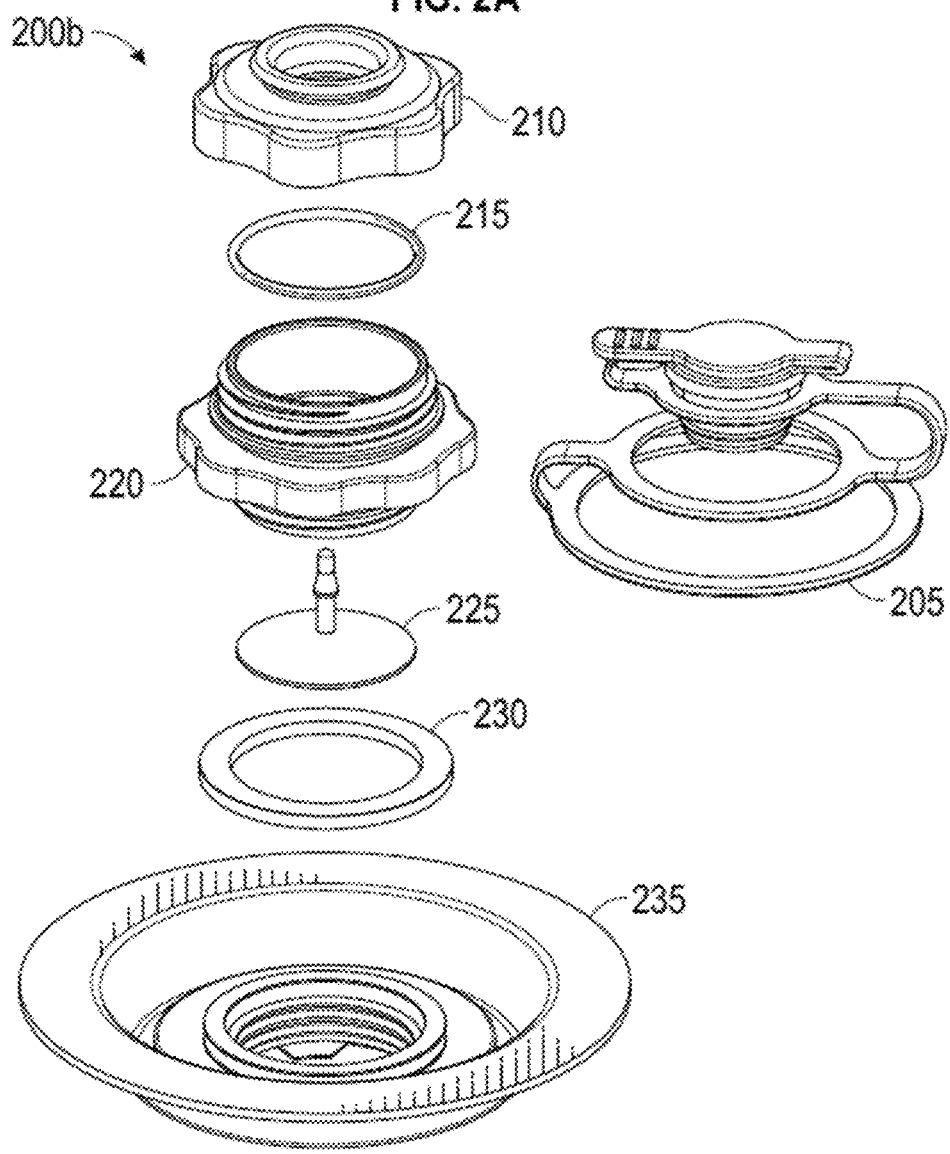
FIG. 2B is an exploded view of components of a valve, in accordance an example embodiment of with the presently disclosed subject matter.

FIG. 2B illustrates an exploded view of components of valve 200, according to embodiments of the present disclosure. The components and arrangements shown in FIG. 2B are not intended to limit the disclosed embodiments as the components used to implement the disclosed processes and features may vary. Valve 200 may include a top cap 205, a top valve 210, a top ring 215, a middle valve 220, a diaphragm 225, a bottom ring 230, and a valve base 235. The top cap 205 may comprise a combination of plastic, polyvinyl chloride ("PVC"), rubber, metal, or any other suitable material or combination of materials. The top cap 205 may be attachable to the valve base 235, the top valve 210, and/or the middle valve 220. The top cap 205 may include one or more circular rings capable of enveloping at least a portion of the middle valve 220, and/or at least a portion of the valve base 235. The one or more circular rings of the top cap 205 may be attached to one another at one or more points of attachment. The one or more circular rings of the top cap 205 may provide the top cap 205 attachment to the middle valve 220 and/or to the valve base 235. When valve 200 is assembled, each of the one or more circular rings of the top cap 205 may fit between an attachment of the top valve 210 and the middle valve 220, and/or an attachment of the middle valve 220 and the valve base 235. The top cap 205 may include a lid capable of connecting and disconnecting from the body of the top cap 205 such that an opening and closing feature are provided. When the lid of the top cap 205 is connected to the body of the top cap 205, the lid may also be connected to the top valve 210. When the lid of top cap 205 is disconnected from the body of top cap 205, an opening is provided such that top valve 210 is exposed. Top valve 210 may have a diameter of 18 mm. As a result, the valve 200 may receive air from an air pump having a diameter of 18 mm.

The top valve 210 may include an opening at the top portion capable of receiving at least a portion of the top cap 205. The top valve 210 may include grooves within an inner portion capable of attaching to another body having similar grooves through a screwing motion. The middle valve 220 may screw into the top valve 210 to create attachment. In some embodiments, the top valve 210 may attach to the middle valve 220 by other means known in the art. As part of attaching to middle valve 220, the top valve 210 may envelop at least a portion of the middle valve 220.

The top ring 215 may be inserted between the middle valve 220 and the top valve 210 during attachment. The top ring 215 may reduce friction and/or wear of the middle valve 220 and/or the top valve 210. The middle valve 220 may have a diameter of 31 mm. The top valve 210 may be disconnected/unattached from the middle valve 220 by an unscrewing motion. When the top valve 210 is unattached from the middle valve 220, an opening is provided such that middle valve 220 is exposed. As a result, the middle valve 220 may allow the valve 200 to fit an air pump having a nozzle size of 18 mm.

As described similarly in reference to FIG. 1B, when the air pressure of the air mattress 400 is inflated, i.e., the air pressure is near capacity, a top portion of the diaphragm 225 may enter an opening of a bottom portion of the middle valve 220 such that a connection is created. At this point, the connection between the diaphragm 225 and the middle valve 220 provides closure of the air valve, which prevents air from entering or exiting the air mattress 400. Conversely, when the air pressure of the mattress 400 is deflated, space exists between the top portion of the diaphragm 225 and the bottom portion of middle valve 220 such that air may enter the mattress 400 for inflation.

A bottom portion of the diaphragm 225 may positioned within the valve base 235. The bottom ring 230 may be positioned between the valve base 235 and the diaphragm 225. The bottom ring 230 may reduce friction and/or wear of the middle valve 220 and/or the valve base 235.

Figure 2C:
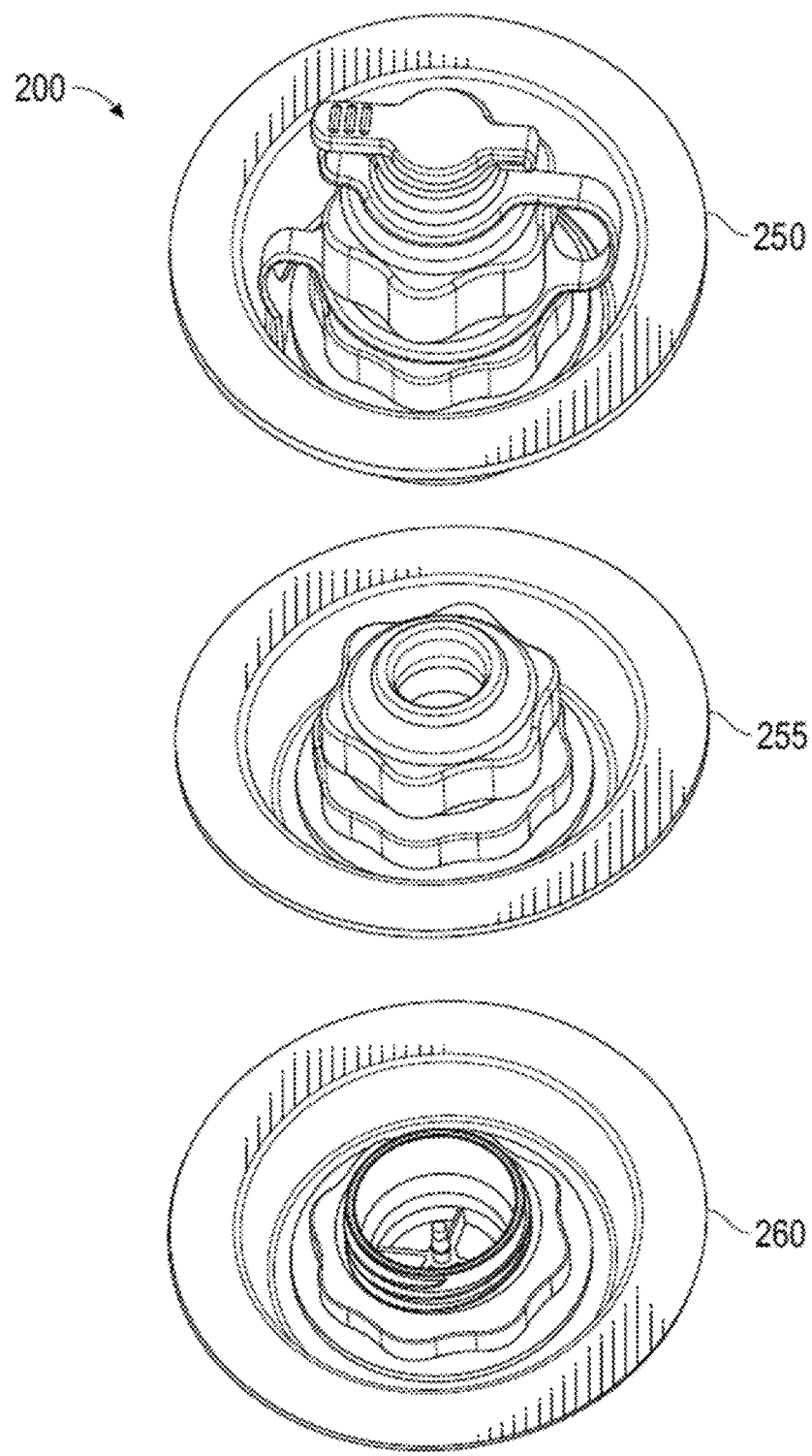
FIG. 2C illustrates stages of assembly of a valve, in accordance with an example embodiment of the presently disclosed subject matter.

FIG. 2C illustrates stages of assembly of a valve. At 250, valve 200 is closed (i.e., the lid of the top cap 205 is connected to the body of top cap 205, and top cap 205 is connected to top valve 210). At 255, the top cap 205 is disconnected from the top valve 210 and the middle valve 220. As shown at 255, when the top cap 205 is disconnected from the top valve 210 and the middle valve 220, the top valve 210 may be exposed. A top portion of the top valve 210 may include an opening. When the top valve 210 is exposed, valve 200 may receive air from an air pump having a diameter of 18 mm. At 260, the top valve 210 is disconnected from the middle valve 220. As a result, a top portion of the middle valve 220 is exposed. The top portion of the middle valve 220 may have an opening allowing a flow of air into the valve. When the middle valve 220 is exposed, valve 200 may receive air from an air pump having a diameter of 31 mm.

Figure 3:
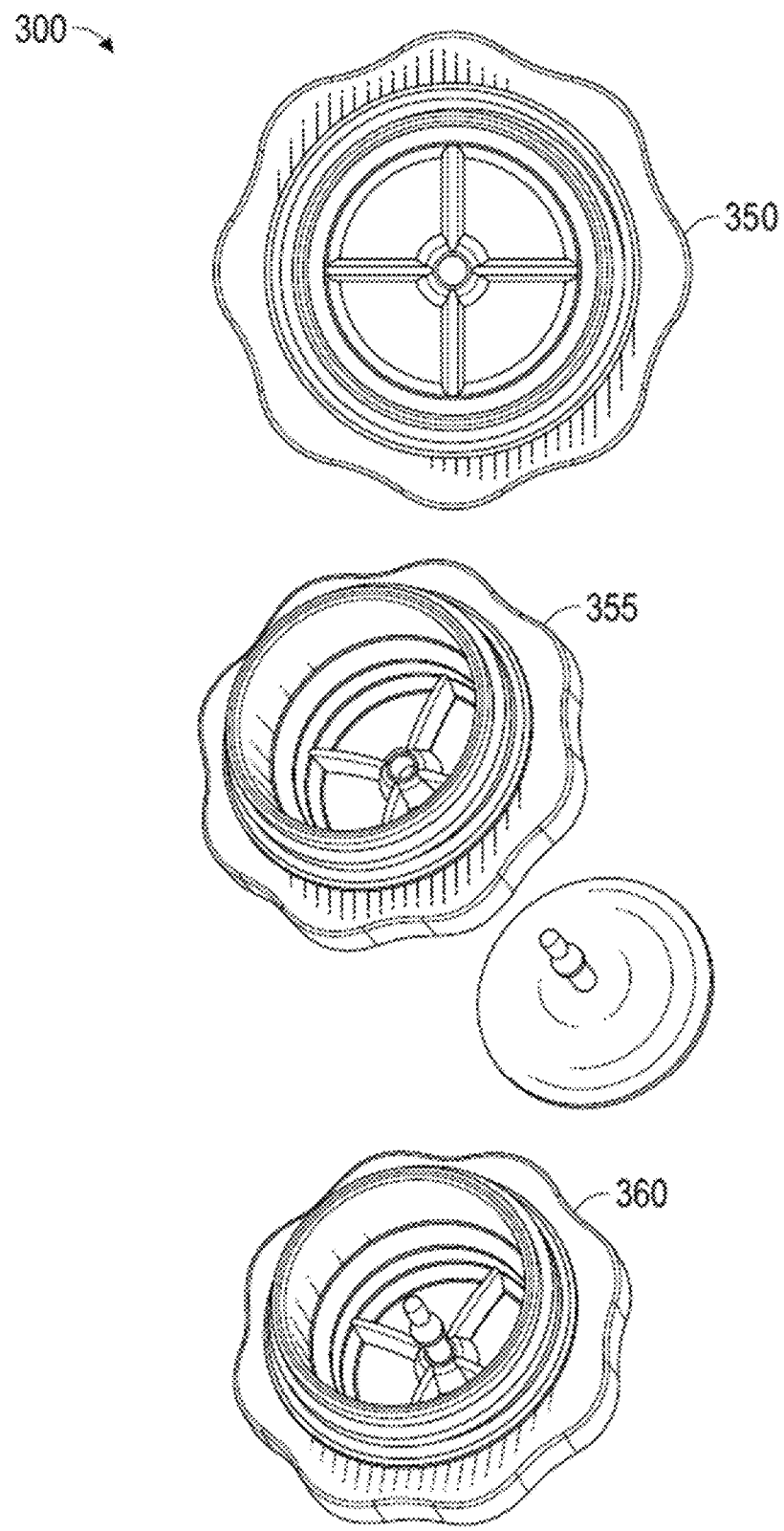
FIG. 3 illustrates stages of assembly of a middle valve section of a valve, in accordance with an example embodiment of the presently disclosed subject matter.

FIG. 3 illustrates stages of assembly of a middle valve section of a valve. As may be appreciated by those skilled in the art, the middle valve 220 may be a component of valve 100 and/or valve 200. At 350, the bottom portion of middle valve 220 can be seen. In this view, middle valve 220 is unattached from the diaphragm 225. This view is consistent with the air mattress 400 being deflated and in a state where the diaphragm 225 does not block air from entering the valve 200. At 355, the diaphragm 225 is shown with a top most portion facing upwards. The middle valve 220 is shown from a top view. As can be seen, the middle valve 220 has four cylindrical portions forming a cross shape at a bottom portion. The four cylindrical portions attach to an inner portion of the middle valve 220 and form a circular opening toward a middle portion of the inner middle valve 220. The top most portion of the diaphragm 225 may have a diameter similar in size to the formed circular opening of middle valve 200 such that the diaphragm 225 may fit into the circular opening. Also, in this view the air mattress 400 is in a deflated state such that the diaphragm 225 does not prevent air from entering the valve 200 for inflation. At 360, the diaphragm 225 is connected to the middle valve 220. In this view, the air mattress 400 is inflated such that the diaphragm 225 prevents air entering the valve 200.

Figure 4:
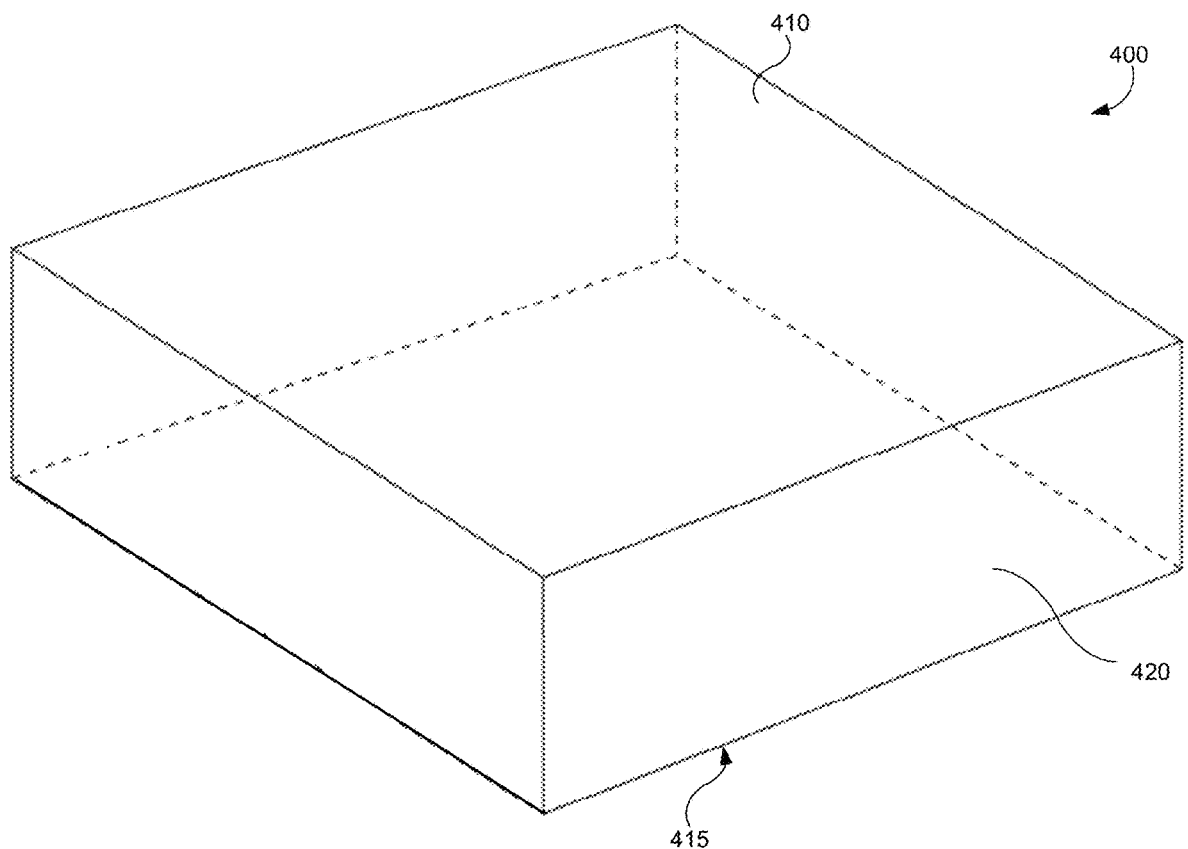
FIG. 4 is a schematic overview of an air mattress, in accordance with an example embodiment of the presently disclosed subject matter.

FIG. 4 is an overview of an air mattress 400. Air mattress 400 may vary in size once inflated based on the desired dimensions and/or number of users. For example, air mattress 400 may be a twin, full, queen, or king size bed. In some embodiments, air mattress 400 may be constructed out of polyvinyl chloride ("PVC"). It is contemplated, however, that other materials such as other plastics or rubber may be used. Further, as shown in FIG. 4, the air mattress 400 may comprise a top surface 410 and bottom surface 415 as well as side surfaces (e.g., side surface 420). Air mattress 400 may further include valve 100, 200, and/or 300.

Figure 5:
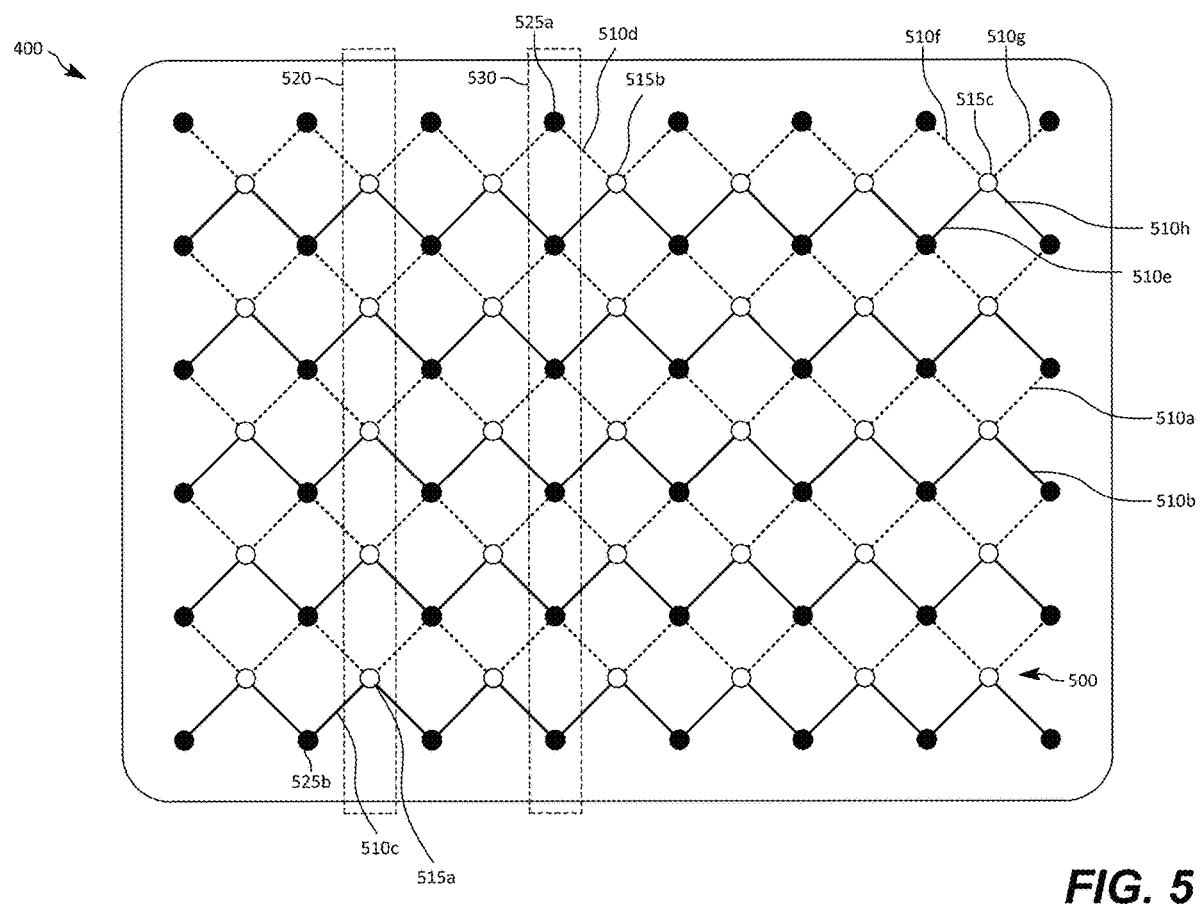
FIG. 5 is a top view of an air mattress having a strip-based internal structure, in accordance an example embodiment of with the presently disclosed subject matter.

FIG. 5 is a top view of an embodiment of an air mattress 400 comprising an internal structure 500. As discussed, in some embodiments, an internal structure 500 of an air mattress 400 may be included in the interior of the air mattress 400. The internal structure 500 may help the air mattress 400 achieve and maintain its intended shape once the air mattress 400 is inflated. Further, an internal structure 500 may prevent the air mattress 400 from over-inflating. Similarly, the internal structure 500 may prevent the top surface (e.g., top surface 410) and the bottom surface (e.g., bottom surface 415) from shearing (i.e., moving laterally relative to each other).

In some embodiments, an internal structure 500 may comprise a plurality of connection strips 510 (e.g., strips 510*a*, 510*b*) having a predetermined length that are attached (i.e., joined, connected, affixed) to one or more of the top surface 410 and bottom surface 415 of the air mattress 400. In some embodiments, a connection strip 510 may be constructed from PVC or various other fiber, fabric, or film that is suitable for a particular application. In some embodiments, a connection strip 510 may be constructed from a single piece of material (e.g., the connection strip 510 may be a single, continuous strip of PVC). In some embodiments, a connection strip 510 may be constructed from a collection (i.e., a plurality) of materials, fibers, or strings.

As shown in FIG. 5, in some embodiments, the air mattress 400 can be transparent, thereby providing a view of the plurality of connection strips 510 (e.g., connection strips 510*a*, 510*b*) comprising the internal structure 500. Further, the transparency of the air mattress 400 provides a view of top surface connection points 515, as highlighted by dashed box 520, which includes top surface connection point 515*a*. Further, the transparency of the air mattress 400 provides a view of bottom surface connection points 525, as highlighted by dashed box 530, which includes bottom surface connection point 525*a*. In some embodiments, connection points (e.g., top surface connection points 515 and bottom surface connection points 525) are on opposing interior surfaces of the top surface 410 and bottom surface 415. Accordingly, in such embodiments, the connection points are on the interior of the air mattress 400. Further, in some embodiments, connection strips 510 may attach directly to connection points 515 and 525. In some embodiments, for example, a connection strip 510 may be welded to top and bottom surface attachment points 515, 525. Further, in some embodiments, connection strips 510 may be glued, sewn, adhered, or otherwise attached to top and bottom surface attachment points 515, 525.

As shown in FIG. 5, in some embodiments, a connection strip 510 may attach between a top surface connection point 515 and a bottom surface connection point 525. In some embodiments, when an air mattress 400 is inflated, as shown in FIG. 5, a connection strip 510 may angle from top surface 410 toward bottom surface 415, or vice versa. For example, as shown in FIG. 5, connection strip 510*c* angles from bottom surface connection point 525*b* toward top surface connection point 515*a*. Similarly, as shown in FIG. 5, connection strip 510*d* angles from bottom surface connection point 525*a* toward top surface connection point 515*b*, according to some embodiments. As will be appreciated, when configured in the manner described and shown in FIG. 5, angled connection strips (e.g., connection strip 510*c* and 510*d*) may comprise an internal structure 500 with sufficient strength to prevent the air mattress 400 from over-inflating and to prevent the top surface and bottom surface (e.g., 410 and 415) from moving laterally in relation to one another (i.e., shearing).

Further, in some embodiments, a plurality of connection strips 510 may connect to a particular top surface connection point 515 or bottom surface connection point 525. For example, in some embodiments and as shown in FIG. 5, four connection strips 510*e-h* attach to a single connection point (i.e., top surface connection point 515*c*). It is contemplated that in various embodiments, any number of connection strips 510 could connect to a particular connection point (e.g., a top surface connection point 515 or bottom surface connection point 525. As shown in FIG. 5, in configurations in which multiple connection strips (e.g., 510*e-h*) attach to a single connection point (e.g., top surface connection point 515*c*), and in which the connection strips 510 angle from a top surface connection points 515 toward bottom surface connection points 525, and vice versa, the plurality of connection strips 510 may constitute an internal structure 500 having a web-like configuration. According to some embodiments, a plurality of top surface connection points 515 may be spaced apart at predetermined distances or intervals, and a plurality of bottom surface connection points may also be spaced apart at predetermined distances or intervals. In some embodiments, a plurality of bottom surface connection points 525 may be located on the bottom surface 415 in positions that are offset relative to the locations of the plurality of top surface connection points 515 on the top surface 410. As will be appreciated, an internal structure 500 having a web-like configuration may further aid in helping an air mattress 400 maintain its intended shape and prevent the air mattress 400 from becoming over-inflated. Further, an internal structure 500 having a web-like configuration may help prevent the top surface 410 and bottom surface 415 of an air mattress 400 from shearing or moving laterally relative to one another.

As noted above, in some embodiments, a connection strip 510 may be constructed from a single piece of material. But, in some embodiments, a connection strip 510 may comprise a plurality of individual strips or strands. In some embodiments, each of the plurality of individual strips that comprise a connection strip may attach to the same top surface connection point 515 and bottom surface connection point 525. In some embodiments, however, a connection strip 510 may comprise attachment strips (or, alternatively, weld strips) at each end of the connection strip 510. An attachment strip may be a strip of material or a patch, that may be used to affix a portion of an internal structure 500 to a portion of the air mattress 400. For example, an attachment strip may be a strip of PVC that may be welded to a surface of the air mattress 400. In some embodiments, a portion of an internal structure 500, for example, a portion of a connection strip 510, may be sandwiched between an attachment strip and a surface of the air mattress 400 and the attachment strip may be welded to the surface of the air mattress 400 to secure the connection strip 510 to it. In such embodiments, the plurality of individual strips or strands comprising the connection strip 510 may be held in place by the opposing attachment strips, and the attachment strips may be affixed to the top and bottom surface connection points (i.e., 515 and 525). For example, in some embodiments, an attachment strip, a portion of a connection strip 510, and a portion of either the top surface 410 or bottom surface 415 may be welded together at a top surface connection point 515 or bottom surface connection point 525.

Figure 6:
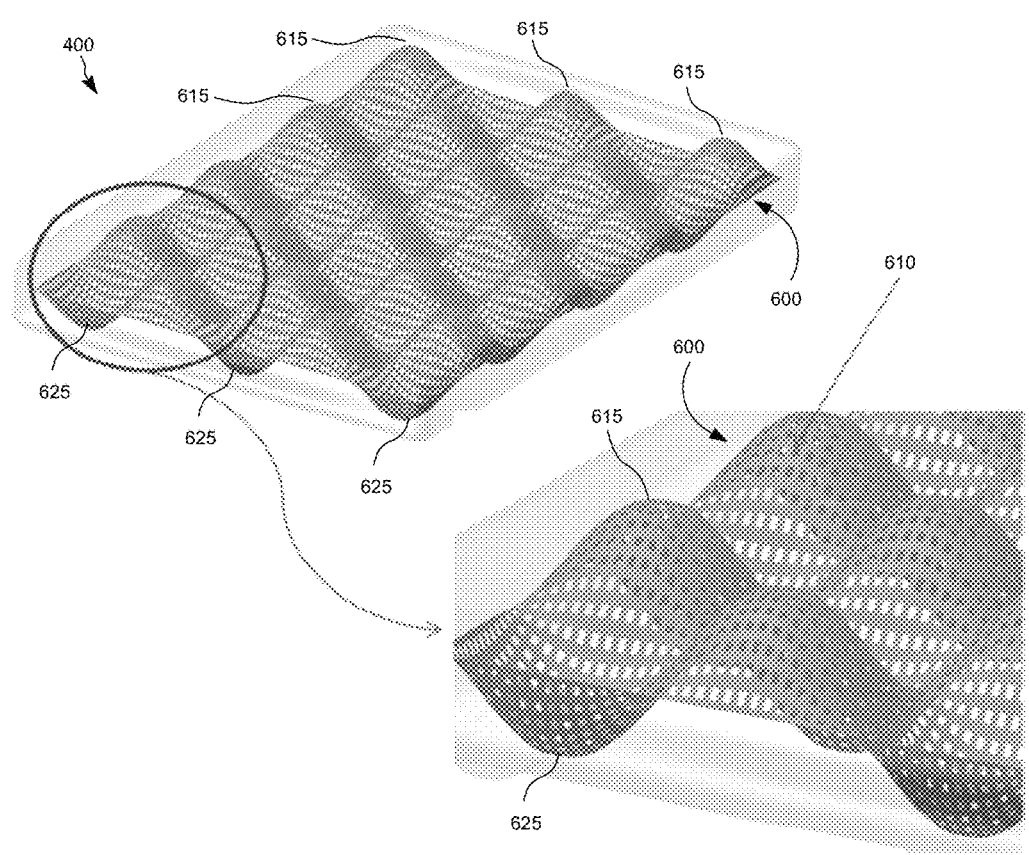
FIG. 6 is a perspective view of an air mattress having a mesh-based internal structure including a detail view of a mesh-based internal structure, in accordance with an example embodiment of the presently disclosed subject matter.

FIG. 6 is a perspective view of an air mattress 400 comprising an internal structure 600 that is composed of a single sheet of material. According to some embodiments, the internal structure 600 may be a continuous piece of material. In some embodiments, the internal structure may be a mesh structure 610 (which may also be referred to as a "mesh web" or a "mesh sheet") that includes one or more apertures forming a mesh. In some embodiments, a mesh structure 610 may be made of a single piece of material including a plurality of apertures. In some embodiments, an internal structure 600 of an air mattress 400 may be included in the interior of the air mattress 400 and may operate in a manner similar to internal structure 500 described above. For example, the internal structure 600 may help the air mattress 400 achieve and maintain its intended shape once the air mattress 400 is inflated. Further, internal structure 600 may prevent the air mattress from over-inflating. Similarly, the internal mesh structure 600 may prevent the top surface (e.g., top surface 410) and the bottom surface (e.g., bottom surface 415) from shearing (i.e., moving laterally relative to each other). In some embodiments, the outer edge of the internal structure 600 may be attached to the inner surfaces of the side surfaces 420.

In some embodiments, a mesh structure 610 may be constructed from PVC or various other fiber, fabric, or film that is suitable for a particular application. In some embodiments, a mesh structure 610 may be constructed form a single piece of material (e.g., the mesh structure 610 may be a single, continuous piece of fiber). In some embodiments, a mesh structure 610 may be constructed from a collection (i.e., plurality) of materials, fibers, or strings.

As shown in FIG. 6, in some embodiments, a mesh structure 610 may attach to the internal surface of an air mattress 400 at various top surface connection points 615 and bottom surface connection points 625. According to some embodiments, the top surface connection points 615 and bottom surface connection points 625 may be located in positions similar to those shown with respect to internal structure 500 and creating a 3D web-like structure as previously described above. For example, according to some embodiments, a plurality of top surface connection points 615 may be spaced apart at predetermined distances or intervals, and a plurality of bottom surface connection points may also be spaced apart at predetermined distances or intervals. In some embodiments, a plurality of bottom surface connection points 625 may be located on the bottom surface 415 in positions that are offset relative to the locations of the plurality of top surface connection points 615 on the top surface 410. Accordingly, in some embodiments, when air mattress 400 is inflated, the mesh structure 610 may take on a 3-dimensional, approximately sinusoidal shape with top and bottom "humps" extending in upwards and/or downwards directions when the airbed is inflated, as shown in FIG. 6. According to some embodiments, the peak of each top hump may attach to the air mattress 400 at a top connection point 615 and the trough of each bottom hump may attach to the air mattress 400 at a bottom connection point 625. As will be appreciated, an internal structure 600 having a web-like configuration may help prevent the top surface 410 and bottom surface 415 of an air mattress 400 from shearing and moving laterally relative to one another.

As described above, a mesh structure 610 may attach (i.e., join, connect, affix) to the top surface 410 and bottom surface 415 of the air mattress 400. In some embodiments, a mesh structure 610 may attach to the air mattress 400 at one or more top surface connection points 615 and one or more bottom surface connection points 625. In some embodiments, portions of a mesh structure 610 may be welded to top and bottom surface attachment points 615, 625. In some embodiments, portions of the mesh structure 610 may be attached to the air mattress 400 with one or more attachment strips. For example, in some embodiments, an attachment strip may be used to secure a portion of a mesh structure 610 to a top surface connection point 615 or a bottom surface connection point 625. According to some embodiments, portions of the mesh structure 610 may be attached to the air mattress 400 with one or more attachment strips. For example, a top connection point 615 may be sandwiched between an attachment strip and the top surface 410 and the three may be welded together. Likewise, a bottom surface connection point 625 may be sandwiched between an attachment strip and the bottom surface 415 and the three may be welded together. According to some embodiments, an attachment strip may be a PVC strip. Further, in some embodiments, a mesh structure 610 may be glued, sewn, adhered, or otherwise attached to top and bottom surface attachment points 615, 625.

Figure 7:
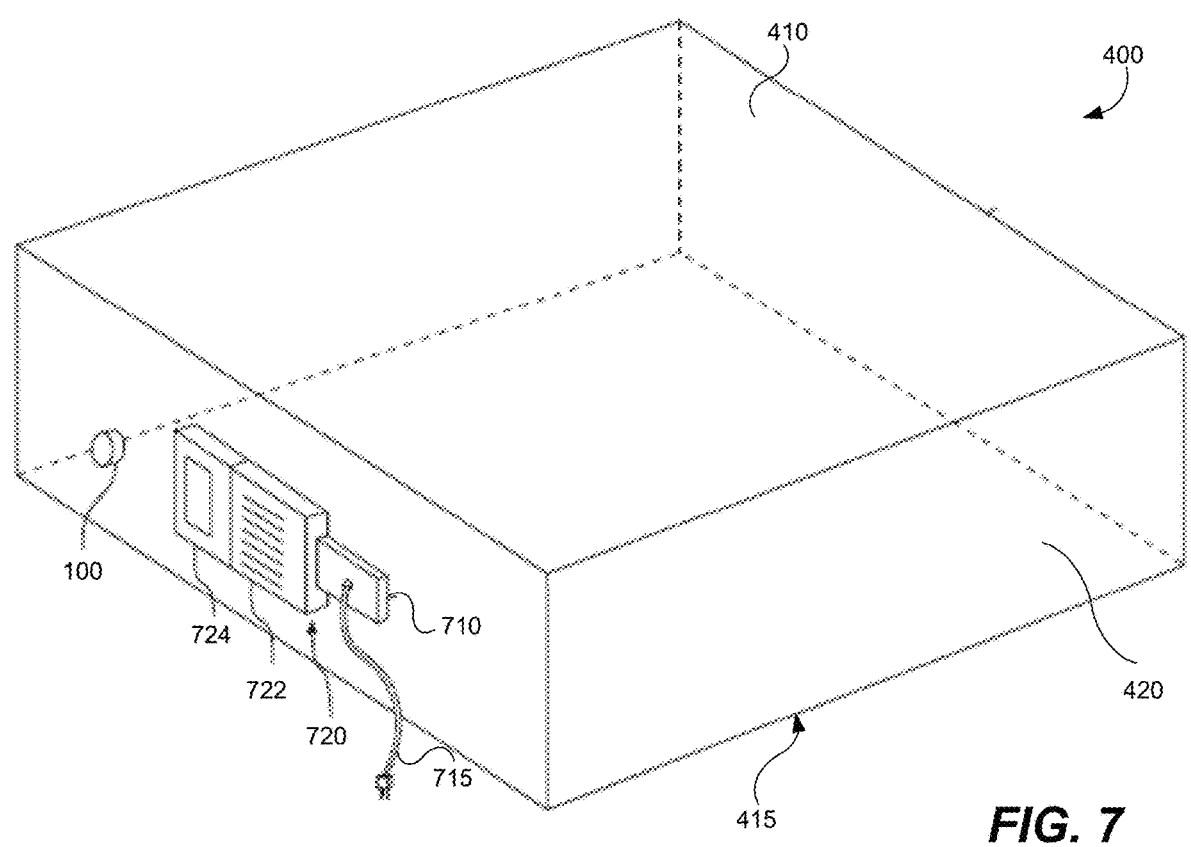
FIG. 7 is a schematic overview of an air mattress comprising various air mattress components, in accordance with an example embodiment of the presently disclosed subject matter.
Figure 8:
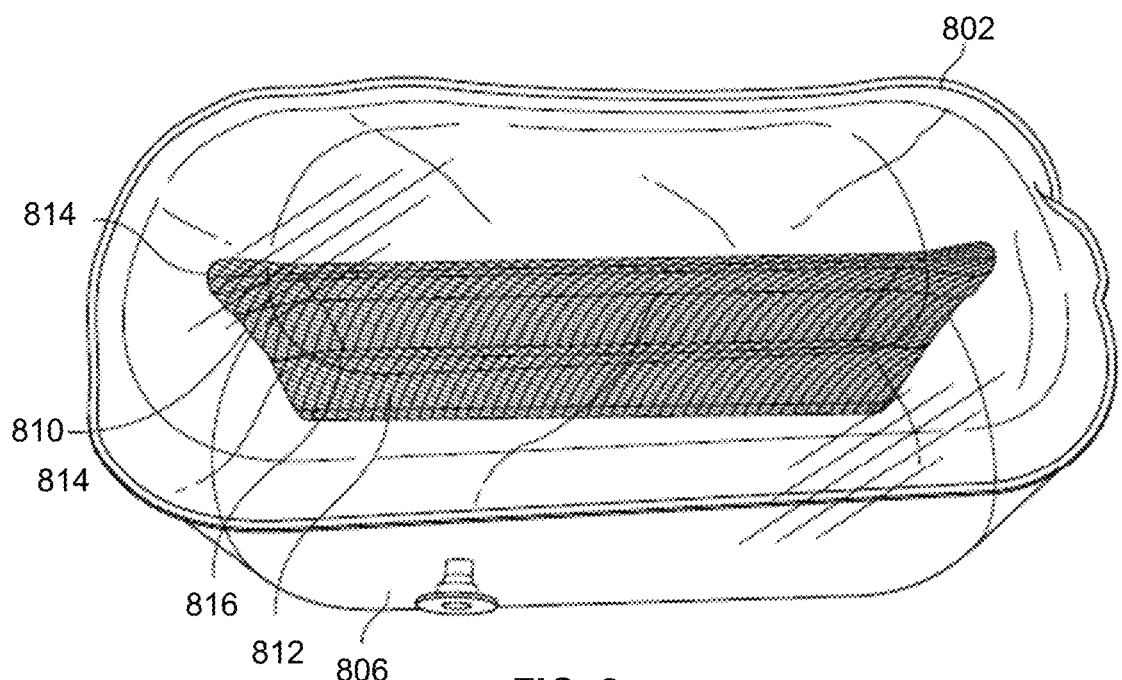
FIG. 8 is a view of an air cushion, according to some example embodiments of the disclosed technology.
Figure 9:
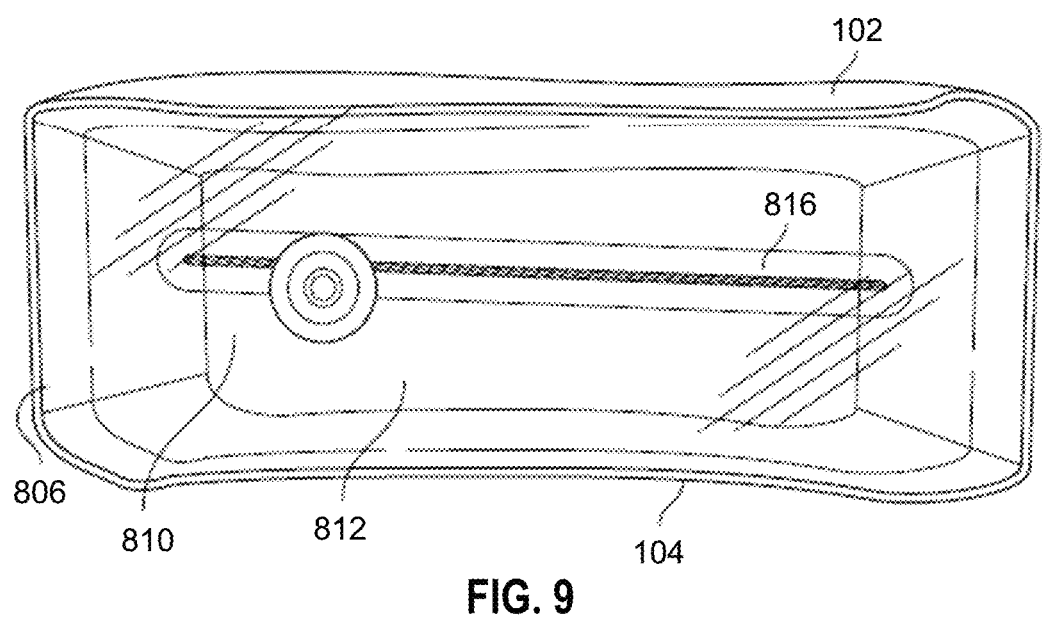
FIG. 9 is a side view of an air cushion, according to some example embodiments of the disclosed technology.
Figure 10:
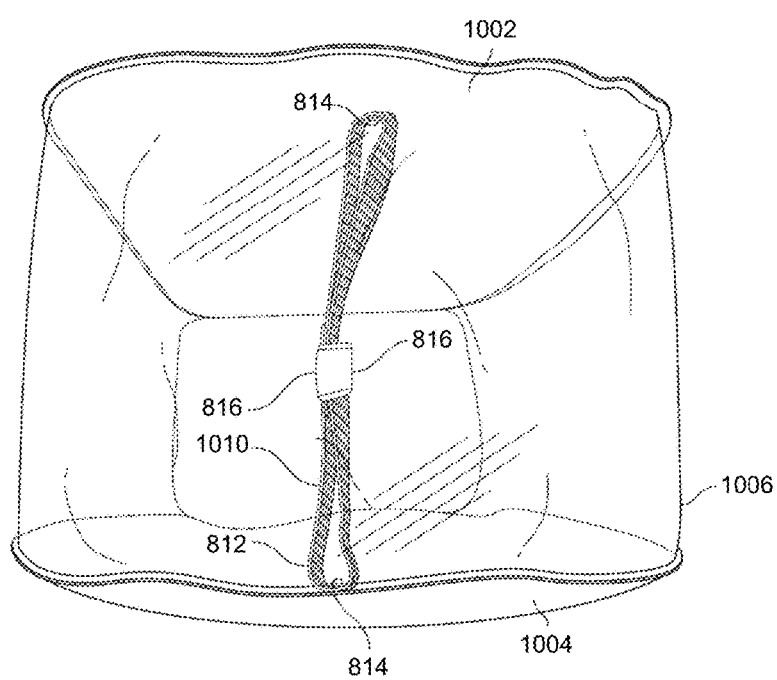
FIG. 10 is an end view of an air cushion, according to some example embodiments of the disclosed technology.
Figure 11:
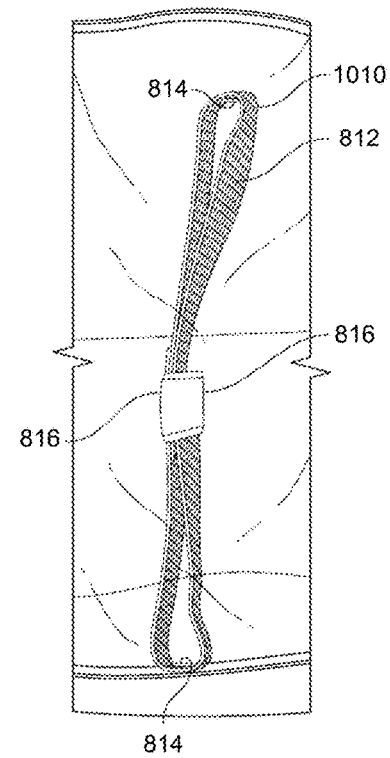
FIG. 11 is a view of an internal support structure of an air cushion, according to some example embodiments of the disclosed technology.

FIG. 7 is an embodiment of an air mattress 400 comprising a top surface 410, bottom surface 415, a plurality of side surfaces (e.g., side surface 420), and various air mattress 400 components. Further, as shown in FIG. 7, in some embodiments, an air mattress 400 may comprise a portable power source 710. In some embodiments, a portable power source 710 may be a battery and provide direct current. In other embodiments, portable power source 710 may include a motor or generator and provide alternating current. It is contemplated that any portable power source may be used. Further, a portable power source 710 may be housed in a power source housing (not shown) on air mattress 400 for convenient transport. In some embodiments, a portable power source 710 may comprise a power plug 715, which may be attachable to portable power source 710. In some embodiments, however, power plug 715 may be used in lieu of portable power source 710. Power plug 715 may include a variety of power plugs, such as those configured to plug into USB ports and 120V standard outlets. As will be appreciated, while a portable power source 710 may be used in outdoor and indoor locations, a power plug 715 may be suited for indoor use when air mattress 100 is placed near an electrical outlet.

In some embodiments, an air mattress may comprise an air control system 720, which may be used to control air flow and to inflate and deflate an air mattress 400. In some embodiments, a portable power source 710 or a power plug 715 (or a combination of both) may provide power to an air control system 720. In some embodiments, an air control system 720 may include an air intake component 722 and a controller 724. An air intake component 722 may be configured to direct ambient air into the air mattress 400 during mattress inflation and direct air from the air mattress 400 during mattress deflation. In some embodiments, the air intake component 722 may comprise an outer seal that inhibits or allows the flow of outside air into the air control system 720. In some embodiments, the air intake component 722 also may include an inner seal (not shown) that inhibits or allows the flow of internal air between air control system 720 and the air chamber (i.e., interior) of an air mattress 400.

In some embodiments, a controller 724 may be configured to receive user input and control the opening or closing of inner and outer seals and/or inflating and deflating of the air mattress 400 via the air control system 720. In some embodiments, the controller 724 may include one or more processors having memory. Also, in some embodiments, the controller 724 may be configured to execute one or more operating modes. For example, operating modes may include inflation mode, deflation mode, air recirculation mode, and standby mode. In some embodiments, the controller 724 may include one or more electronic components that allow a user to switch between modes.

In some embodiments, inflation mode may begin when the controller 724 receives user input to inflate the air mattress 400. In some embodiments, inflation mode may last until the controller 724 receives additional user input to stop inflating the air mattress 400. In some embodiments, however, the controller 724 may automatically control the speed and duration of inflation based on a predetermined or user supplied air pressure for the air in the air mattress 400. During inflation mode, both the inner and outer seals may be open to allow ambient air to flow into the air mattress 400.

In some embodiments, deflation mode may begin when the controller 724 receives user input to deflate the air mattress 400. For example, in some embodiments, deflation mode may last until the controller 724 receives additional user input to stop deflating the air mattress 400. Further, in some embodiments, the controller 724 may automatically control the speed and duration of deflation based on a predetermined or user supplied air pressure for the air in the air mattress 400. During deflation mode, both the inner and outer seals may be open to allow ambient air to flow out of the air mattress 400.

According to some embodiments, an air recirculation mode may begin when the controller 724 receives user input to circulate air within air mattress 100. In doing so, the controller 724 may direct the outer seal to close while the inner seal remains open, thus allowing air to enter the air intake component 722, but not escape the air mattress 400. According to some embodiments, circulating air within an air mattress 400 may cause a vibrating or massaging pulse on the surface of the air mattress 400 and/or adjust air pressure via air control system 720. In some embodiments, air recirculation mode may last until the controller 724 receives additional user input to stop circulating air within the air mattress 400. Also, in some embodiments, the controller 724 may automatically control the time duration and/or interval to recirculate air within the air mattress 400.

In some embodiments, a standby mode may occur when the controller 724 receives power from portable power source 710 and/or power plug 715 and is not placed in another mode. For example, the controller 724 may operate in standby mode before receiving user input. In some embodiments, the controller 724 may also direct the inner seal to close to inhibit air recirculation. Also, in some embodiments, the controller 724 may direct the inner seal to remain open. It is contemplated that the air mattress 400 may only include the outer seal and not the inner seal, according to some embodiments.

In some embodiments, an air mattress 400 may comprise valve 100, 200, and/or 300. As shown, air mattress 400 may comprise valve 100. According to some embodiments, valve 100 may be configured to inhibit the flow of air out of the air mattress 400 when valve 100 is in a closed position and allow air flow out of air mattress 400 when 100 is in an open position.

FIGS. 8-11 depict an air cushion representative of an air mattress, in accordance with some embodiments of the disclosed technology. The air cushion depicted includes a single internal support structure 810, which includes a first side strip 816 positioned outside the loop 812 and proximate the overlapping ends and a second side strip 816 that may be positioned outside the loop 812 and adjacent a portion of the loop 812 opposite the overlapping ends of the loop 812, as discussed above. As shown most clearly in FIGS. 10 and 11, attachment of the first side strip 816 to the second side strip 816 causes the loop 812 to "pinch" together at or near the first and second side strips 816. Though only a single support structure 1010 is shown, it is understood that a plurality of similar support structures could be used in an air mattress, according to the disclosed technology.

Figure 12:
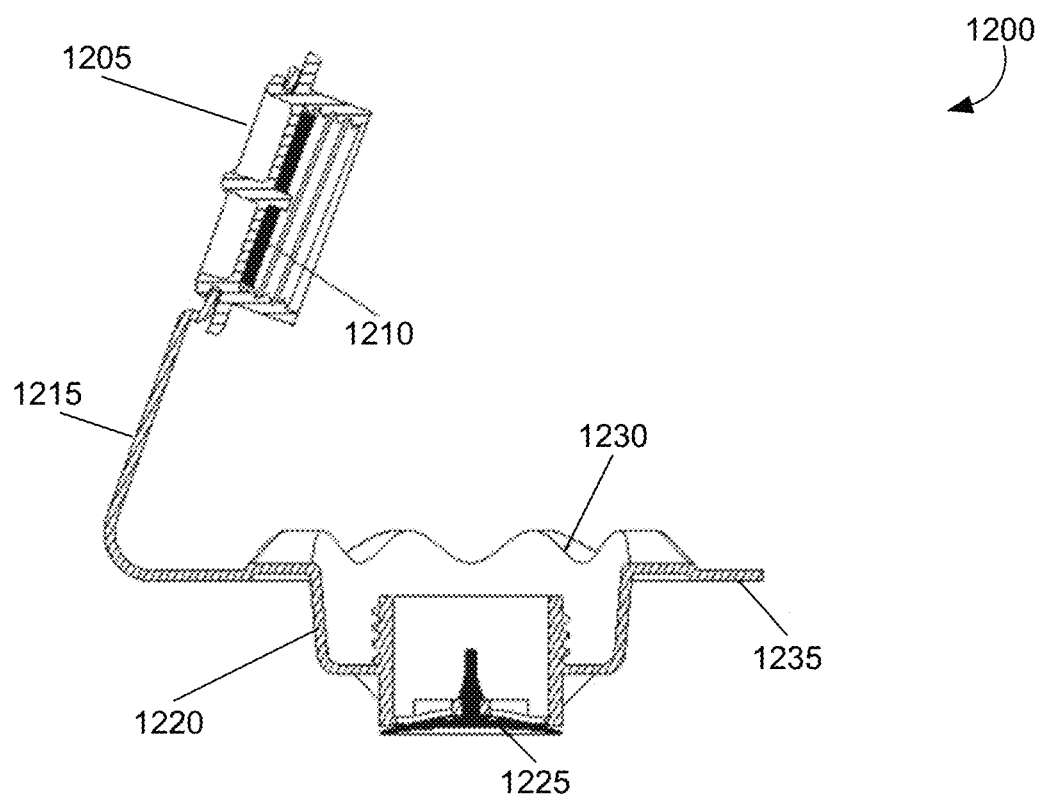
FIG. 12 is a sectional view of a valve assembly that may be connected to a built-in manual air pump, according to some example embodiments of the disclosed technology.

FIG. 12 illustrates a sectional view of a valve assembly that may be connected to a built-in manual air pump. The built-in manual air pump may be included internally with an air mattress such as air mattress 400. The valve assembly 1200 may include a valve cap 1205, a cap gasket 1210, a cap strap 1215, a valve body 1220, a diaphragm valve 1225, a wavy surface 1230, and/or a flat flange 1235. The valve body 1220 may comprise various materials. For example, the valve body 1220 and/or its components may be constructed from a combination of plastic, polyvinyl chloride ("PVC"), rubber, metal, or any other suitable material or combination of materials to provide the desired qualities described herein. In some embodiments, the valve body 1220 may be injection molded. The valve body 1220 may be connected to the air mattress 400 by high frequency welding and/or any other suitable means of attachment known in the art. The valve body 1220 may comprise the flat flange 1235, the wavy surface 1230, and/or the cap strap 1215. The flat flange 1235 may be connected to a top surface of the air mattress 400 such that it creates a flush connection with the air mattress 400.

The wavy surface 1230 may have a rippled shape. At least in part because of its shape, the wavy surface 1230 may allow air to flow into the built-in air pump when the valve assembly 1200 is covered (e.g., a user has his foot on top of the valve assembly 1200). As will be appreciated, such design allows the user to continually pump the air mattress 400 without lifting his or her foot from the built-in manual air pump, thus providing added efficiency. At a side surface of the wavy surface 1230, the flat flange 1235 may be connected to the wavy surface 1230. The cap strap 1215 may extend from the flat flange 1235 and connect to the valve cap 1205. The valve cap 1205 may have a hook-like portion on a side surface allowing the cap strap 1215 to attach to the valve cap 1205. When attached to the valve cap 1205, the cap strap 1215 may be used to keep the valve cap 1205 connected to the valve body 1220 and thus, preventing the cap from becoming a loose part.

The diaphragm valve 1225 may be located at a bottom portion of the valve body 1220. The diaphragm valve 1225 may operate from an open or a closed position. When the valve assembly 1200 is stepped on, air may be pushed down the valve assembly 1200 and into the built-in air pump. The air within the built-in air pump may then enter the main chamber of the air mattress 400. Consequently, the air pressure within the air mattress 400 will increase and the diaphragm valve 1225 will close and thus, shut off air flowing into the valve assembly 1220. Conversely, when the air pressure within the air mattress 400 is low, the diaphragm valve 1225 may be in an open position allowing air to enter the valve assembly 1220.

The valve cap 1205 may be configured to attach to the valve body 1220. In some embodiments, the valve cap 1205 may include internal grooves at a bottom portion capable of attachment to the valve body 1220 by a screwing motion. When the valve cap 1205 is attached to the valve body 1220, the valve cap 1205 may prevent air from entering the valve assembly 1200. Alternately, when the valve cap 1205 is not attached to the valve body 1220, air may enter the valve assembly 1200. The valve cap gasket 1210 may be positioned within the valve cap 1205. The valve cap gasket 1210 may help ensure the prevention of air from entering the valve body 1220 when the valve cap 1205 is attached to the valve body 1220.

Figure 13A:
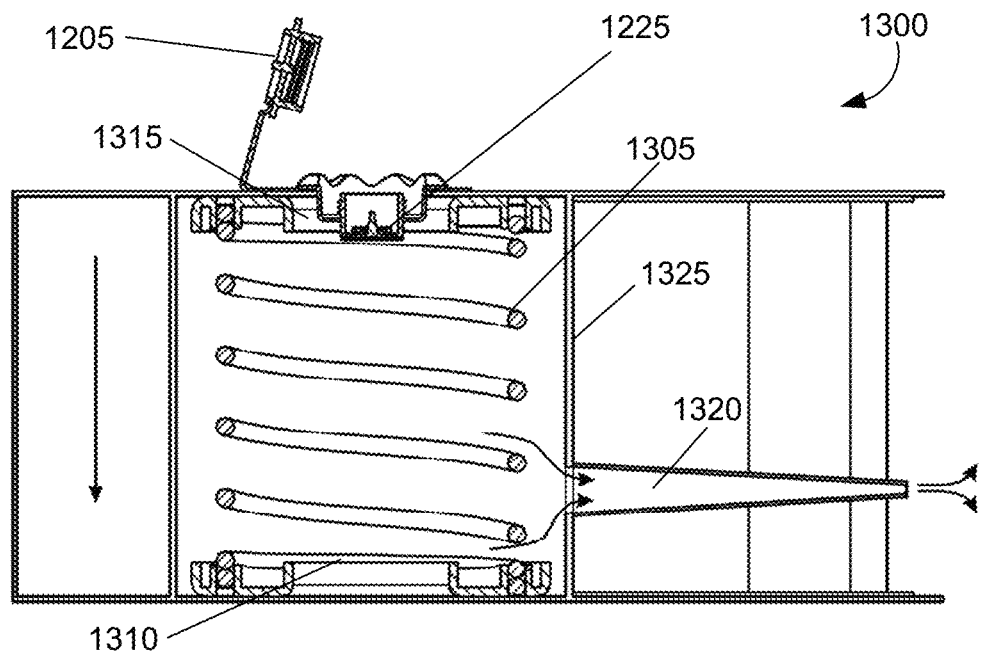
FIG. 13A is a sectional view of a built-in air pump with a closed diaphragm valve, according to some example embodiments of the disclosed technology.
Figure 13B:
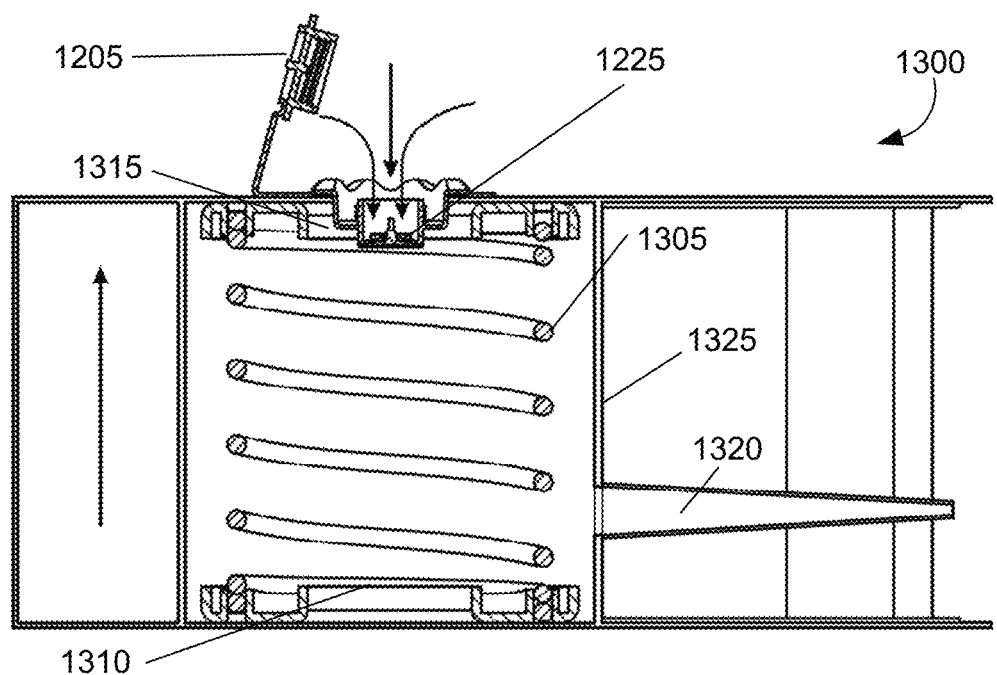
FIG. 13B is a sectional view of a built-in air pump with an open diaphragm valve, according to some example embodiments of the disclosed technology.

FIGS. 13A-B illustrate a sectional view of a built-in air pump with a closed and opened diaphragm valve, respectively. The built-in air pump 1300 may be included within the air mattress 400. In some embodiments, the air mattress 400 may include a plurality of the built-in air pump 1300. The built-in air pump 1300 may be positioned in various positions on the air mattress 400. The built-in air pump 1300 may include a compression spring 1305, a bottom end cap 1310, a top end cap 1315, a bellow 1320, a tube-like construction 1325, and the valve assembly 1200. The bottom end cap 1310 and the top end cap 1315 may be attached to the compression spring 1305 at opposite ends of the compression spring 1305. The top end cap 1315 may be connected to the valve body 1220 providing a connection between the valve assembly 1200 and the built-in air pump 1300. The tube-like construction 1325 may comprise a plurality of flexible sheets. The tube-like construction 1325 may form a hollow cylindrical shaped structure. The bottom end cap 1310, the top end cap 1315, and the compression spring 1305 may be positioned within the tube-like construction 1325. At a side surface, the tube-like construction 1325 may be attached to the bellow 1320. Downward pressing on the valve assembly 1200 may cause air to flow through the tube-like construction 1325, into the bellow 1320, and then into the main chamber of the air mattress 400.

Referring to FIG. 13A, high air pressure within the built-in air pump 1300 may close the diaphragm valve 1225 restricting the intake of air through the valve assembly 1200. When the air mattress 400 is inflated and the valve assembly 1200 is stepped on, the air pressure within the air mattress 400 and the built-in air pump 1300 may cause the compression spring 1305 and the tube-like construction 1325 not to contract. Consequently, the top end cap 1315 may not move toward the bottom end cap 1310. Therefore, air may not be pushed through the bellow 1320 and into the air mattress 400. Further, the air pressure acting against the tube-like construction 1325 may cause the tube-like construction 1325 to serve as one-way valve preventing air from leaving the air mattress 400.

Turning to FIG. 13B, the diaphragm valve 1225 may be open when the air pressure within the internal chamber 1300 is low. A low air pressure may be an air pressure insufficient to inflate the air mattress 400. When the air assembly 1200 is stepped on, the air compression spring 1305 and the tube-like construction 1325 may contract allowing the top end cap 1315 to be moved downward toward the bottom end cap 1310. The downward movement of the top end cap 1315 may cause air within the internal air chamber 1300 to be pushed downward and through the bellow 1320. The air pushed through the bellow 1320 enters the main chamber of the air mattress 400 causing the air mattress 400 to be inflated.

Figure 14:
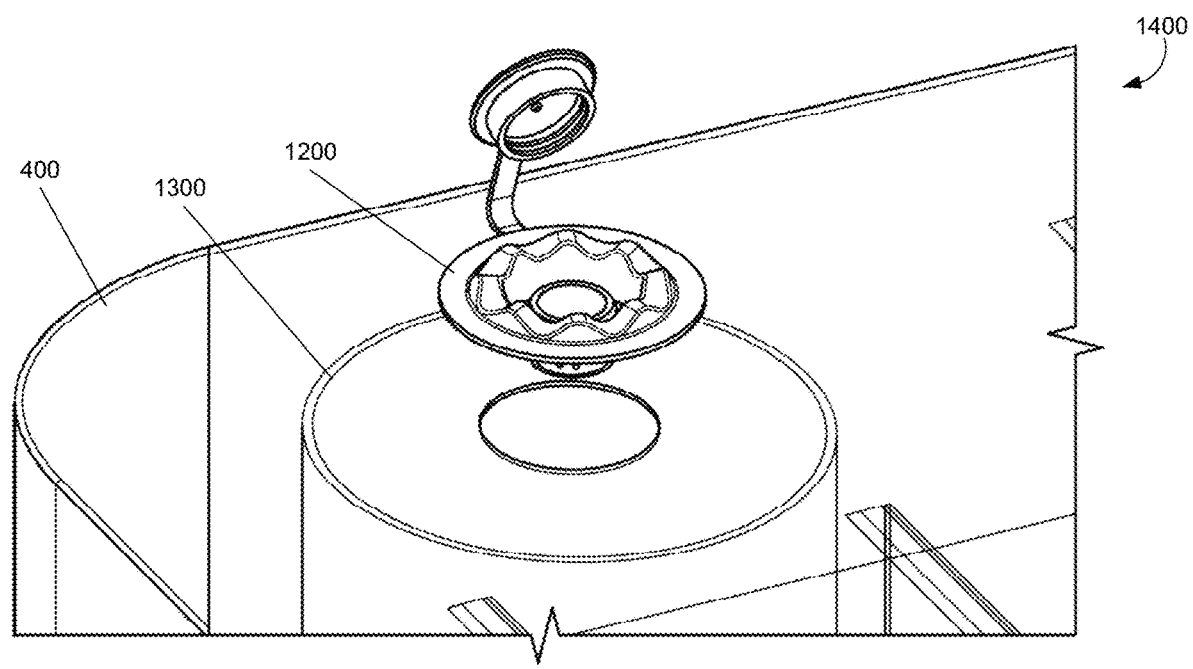
FIG. 14 is a top view of a valve assembly connected to a built-in manual air pump of an air mattress, according to some example embodiments of the disclosed technology.

FIG. 14 depicts a top view of a valve assembly connected to a built-in manual air pump of an air mattress. Within an internal portion of the air mattress 400, the built-in air pump 1300 may be included. The valve assembly 1200 may be positioned on a top surface of the air mattress 400 above the built-in air pump 1300 such that the valve assembly 1200 may attach to the built-in air pump 1300.

An embodiment of the present disclosure can be implemented according to at least the following:

Clause 1: An air mattress comprising: a built-in air pump provided within an internal portion of the air mattress; a valve assembly disposed on a top surface of the air mattress and connected to the built-in air pump, the top surface having a plurality of top surface connection points on an internal side of the top surface, and the valve assembly comprising: a valve body attached to the top surface of the air mattress; a diaphragm valve positioned on a bottom portion of the valve body; a valve cap configured to attach to the valve body, the valve cap having a hook-like portion; and a cap gasket positioned within the valve cap; a bottom surface having a plurality of bottom surface connection points on an internal side of the bottom surface; and one or more side surfaces connecting the top surface to the bottom surface such that the top surface, the bottom surface, and the one or more side surfaces form an airtight enclosure that defines an interior volume of the air mattress, wherein the internal sides of the top and bottom surfaces face into the airtight enclosure.

Clause 2: The air mattress of Clause 1, wherein the built-in air pump further comprises: a tube-like construction defining an inner cavity between the top surface and the bottom surface; a compression spring located within the inner cavity and attached to the top surface and the bottom surface; a bellow connected to a side surface of the tube-like construction, the bellow providing an air pathway from the inner cavity to the interior volume of the air mattress; a top end cap attached to a top portion of the compression spring and abutting the top surface; and a bottom end cap attached to a bottom portion of the compression spring and abutting the bottom surface.

Clause 3: The air mattress of Clause 2, wherein the tube-like construction comprises a plurality of flexible sheets.

Clause 4: The air mattress of Clause 2, wherein when a downward force on the valve assembly exceeds an outward force exerted on the diaphragm valve of the valve assembly by the compression spring, and wherein when an inward force of atmospheric air pressure acting on the valve assembly exceeds an outward force exerted on the diaphragm valve of the valve assembly by air pressure internal to the air mattress, the downward force causes the compression spring and the tube-like construction to contract such that the top end cap moves toward the bottom end cap.

Clause 5: The air mattress of Clause 4, wherein when the top end cap moves toward the bottom end cap, air contained in the inner cavity flows through the bellow into the interior volume of the air mattress.

Clause 6: The air mattress of Clause 1, wherein when an outward force exerted on the diaphragm valve of the valve assembly by air pressure internal to the air mattress exceeds an inward force exerted on the valve assembly by atmospheric air pressure, the outward force causes the diaphragm valve to close the valve body.

Clause 7: The air mattress of Clause 1, wherein the valve body comprises: a flat flange connected to the top surface of the air mattress device; a wavy surface having a side surface, the wavy surface being connected to the flat flange at the side surface of the wavy surface; and a cap strap configured to attach to the valve cap at the hook-like portion of the valve cap.

Clause 8: The air mattress of Clause 7, wherein the wavy surface includes a set of openings such that the wavy surface allows air to enter the valve assembly when the valve assembly is covered.

Clause 9: The air mattress of Clause 7, wherein the valve body is injection molded.

Clause 10: The air mattress of Clause 1, further comprising a mesh web that is attached to two or more of the plurality of top surface connection points and two or more of the plurality of bottom surface connection points.

Clause 11: An air mattress comprising: a top surface having a plurality of top surface connection points on an internal side of the top surface; a bottom surface having a plurality of bottom surface connection points on an internal side of the bottom surface; one or more side surfaces connecting the top surface to the bottom surface such that the top surface, the bottom surface, and the one or more side surfaces form an airtight enclosure that defines an interior volume of the air mattress; a built-in air pump provided within an internal portion of the air mattress, the built-in air pump comprising: a tube-like construction defining an inner cavity between the top surface and the bottom surface; a compression spring located within the inner cavity and attached to the top surface and the bottom surface; a bellow connected to a side surface of the tube-like construction, the bellow providing an air pathway from the inner cavity to the interior volume of the air mattress; a top end cap attached to a top portion of the compression spring and abutting the top surface; and a bottom end cap attached to a bottom portion of the compression spring and abutting the bottom surface; and a valve assembly disposed on a top surface of the air mattress device and connected to the built-in air pump.

Clause 12: The air mattress of Clause 11, wherein the valve assembly comprises: a valve body; a diaphragm valve positioned at a bottom portion of the valve body; a valve cap configured to attach to the valve body, the valve cap having a hook-like portion; and a cap gasket positioned within the valve cap.

Clause 13: The air mattress of Clause 12, wherein the valve body comprises: a flat flange connected to the top surface of the air mattress device; a wavy surface having a side surface, wherein the wavy surface is connected to the flat flange at the side surface; and a cap strap configured to attach to the valve cap at the hook-like portion of the valve cap.

Clause 14: The air mattress of Clause 13, wherein the wavy surface includes a set of openings such that the wavy surface allows air to enter the valve assembly when the valve assembly is covered.

Clause 15: The air mattress of Clause 12, wherein the valve body is injection molded.

Clause 16: The air mattress of Clause 11, further comprising a mesh web that is attached to two or more of the plurality of top surface connection points and two or more of the plurality of bottom surface connection points.

Clause 17: The air mattress of Clause 11, wherein the tube-like construction comprises a plurality of flexible sheets.

Clause 18: The air mattress of Clause 11, wherein when a downward force on the valve assembly exceeds an outward force exerted on the diaphragm valve of the valve assembly by the compression spring, and wherein when an inward force of atmospheric air pressure acting on the valve assembly exceeds an outward force exerted on the diaphragm valve of the valve assembly by air pressure internal to the air mattress, the downward force causes the compression spring and the tube-like construction to contract such that the top end cap moves toward the bottom end cap.

Clause 19: The air mattress of Clause 18, wherein when the top end cap moves toward the bottom end cap, air contained in the inner cavity flows through the bellow into the interior volume of the air mattress.

Clause 20: The air mattress of Clause 11, wherein when an outward force exerted on the diaphragm valve of the valve assembly by air pressure internal to the air mattress exceeds an inward force exerted on the valve assembly by atmospheric air pressure, the outward force causes the diaphragm valve to close the valve body.

Clause 21: The air mattress of Clause 11, wherein when an inward force exerted on the valve assembly by atmospheric air pressure exceeds an outward force exerted on the diaphragm valve of the valve assembly by air pressure internal to the air mattress, the diaphragm valve is configured to allow air to enter the valve assembly.

Clause 22: A method of inflating an air mattress, the method comprising: depressing a valve assembly disposed on a top surface of the air mattress and connected to a built-in air pump, the valve assembly comprising: a valve body attached to the top surface of the air mattress; a diaphragm valve positioned on a bottom portion of the valve body; a valve cap configured to attach to the valve body, the valve cap having a hook-like portion; and a cap gasket positioned within the valve cap; applying a downward force to the built-in air pump by exceeding an outward force of air pressure exerted on the valve assembly, the built-in air pump comprising: a tube-like construction defining an inner cavity between the top surface and a bottom surface of the air mattress; a compression spring located within the inner cavity and attached to the top surface and the bottom surface; a bellow connected to a side surface of the tube-like construction, the bellow providing an air pathway from the inner cavity to an interior volume of the air mattress; a top end cap attached to a top portion of the compression spring and abutting the top surface; and a bottom end cap attached to a bottom portion of the compression spring and abutting the bottom surface; contracting the compression spring and the tube-like construction allowing the top end cap to move toward the bottom end cap; and pushing air contained in the inner cavity through the bellow and into the interior volume due to the contracting.

Clause 23: The method of Clause 22, wherein when the outward force of air pressure pushes the diaphragm valve into the valve body to seal the valve body when the air mattress is inflated.

Clause 24: The method of Clause 22, wherein applying the downward force further comprises exceeding an outward force of the compression spring.

Clause 25: The method of Clause 22, wherein the valve body is injection molded.

Clause 26: The method of Clause 22, further comprising a mesh web that is attached to two or more of the plurality of top surface connection points and two or more of the plurality of bottom surface connection points.

Clause 27: The method of Clause 22, wherein the tube-like construction comprises a plurality of flexible sheets.

While the present disclosure has been described in connection with a plurality of exemplary aspects, as illustrated in the various figures and discussed above, it is understood that other similar aspects can be used or modifications and additions can be made to the described aspects for performing the same function of the present disclosure without deviating therefrom. For example, in various aspects of the disclosure, methods and compositions were described according to aspects of the presently disclosed subject matter. But, other equivalent methods or composition to these described aspects are also contemplated by the teachings herein. Therefore, the present disclosure should not be limited to any single aspect, but rather construed in breadth and scope in accordance with the appended claims.

What is claimed is:

1. An air mattress comprising:
    a built-in air pump provided within an internal portion of the air mattress;
    a valve assembly disposed on a top surface of the air mattress and connected to the built-in air pump, the top surface having a plurality of top surface connection points on an internal side of the top surface, and the valve assembly comprising:
        a valve body attached to the top surface of the air mattress, wherein the valve body comprises:
            a flat flange connected to the top surface of the air mattress; and
            a wavy surface having a side surface, the wavy surface being connected to the flat flange at the side surface of the wavy surface;
        a diaphragm valve positioned on a bottom portion of the valve body;
        a valve cap configured to attach to the valve body; and
        a cap gasket positioned within the valve cap;
    a bottom surface having a plurality of bottom surface connection points on an internal side of the bottom surface; and
    one or more side surfaces connecting the top surface to the bottom surface such that the top surface, the bottom surface, and the one or more side surfaces form an airtight enclosure that defines an interior volume of the air mattress, wherein the internal sides of the top and bottom surfaces face into the airtight enclosure.

2. The air mattress of claim 1, wherein the built-in air pump further comprises:
    a hollow structure defining an inner cavity between the top surface and the bottom surface;
    a compression spring located within the inner cavity and attached to the top surface and the bottom surface;
    a bellow connected to a side surface of the hollow structure, the bellow providing an air pathway from the inner cavity to the interior volume of the air mattress;
    a top end cap attached to a top portion of the compression spring and abutting the top surface; and
    a bottom end cap attached to a bottom portion of the compression spring and abutting the bottom surface.

3. The air mattress of claim 2, wherein the hollow structure comprises a plurality of flexible sheets.

4. The air mattress of claim 2, wherein when a downward force on the valve assembly exceeds an outward force exerted on the diaphragm valve of the valve assembly by the compression spring, and wherein when an inward force of atmospheric air pressure acting on the valve assembly exceeds an outward force exerted on the diaphragm valve of the valve assembly by air pressure internal to the air mattress, the downward force causes the compression spring and the hollow structure to contract such that the top end cap moves toward the bottom end cap.

5. The air mattress of claim 4, wherein when the top end cap moves toward the bottom end cap, air contained in the inner cavity flows through the bellow into the interior volume of the air mattress.

6. The air mattress of claim 1, wherein when an outward force exerted on the diaphragm valve of the valve assembly by air pressure internal to the air mattress exceeds an inward force exerted on the valve assembly by atmospheric air pressure, the outward force causes the diaphragm valve to close the valve body.

7. The air mattress of claim 1, wherein the valve body further comprises:
    a cap strap configured to attach to the valve cap.

8. The air mattress of claim 7, wherein the wavy surface includes a set of openings such that the wavy surface allows air to enter the valve assembly when the valve assembly is covered.

9. The air mattress of claim 7, wherein the valve body is injection molded.

10. The air mattress of claim 1, further comprising a mesh web that is attached to two or more of the plurality of top surface connection points and two or more of the plurality of bottom surface connection points.

11. An air mattress comprising:
    a top surface having a plurality of top surface connection points on an internal side of the top surface;
    a bottom surface having a plurality of bottom surface connection points on an internal side of the bottom surface;
    one or more side surfaces connecting the top surface to the bottom surface such that the top surface, the bottom surface, and the one or more side surfaces form an airtight enclosure that defines an interior volume of the air mattress;
    a built-in air pump provided within an internal portion of the air mattress, the built-in air pump comprising:
        a hollow structure defining an inner cavity between the top surface and the bottom surface;
        a compression spring located within the inner cavity and attached to the top surface and the bottom surface;
        a bellow connected to a side surface of the hollow structure, the bellow providing an air pathway from the inner cavity to the interior volume of the air mattress;
        a top end cap attached to a top portion of the compression spring and abutting the top surface; and a bottom end cap attached to a bottom portion of the compression spring and abutting the bottom surface; and a valve assembly disposed on the top surface of the air mattress and connected to the built-in air pump, wherein the valve assembly comprises a valve body comprising:

a flat flange connected to the top surface of the air mattress; and a wavy surface having a side surface, the wavy surface being connected to the flat flange at the side surface of the wavy surface.

12. The air mattress of claim 11, wherein the valve assembly comprises:

a diaphragm valve positioned at a bottom portion of the valve body;

a valve cap configured to attach to the valve body; and a cap gasket positioned within the valve cap.

13. The air mattress of claim 12, wherein the valve body further comprises:

a cap strap configured to attach to the valve cap.

14. The air mattress of claim 11, wherein the wavy surface includes a set of openings such that the wavy surface allows air to enter the valve assembly when the valve assembly is covered.

15. The air mattress of claim 12, wherein the valve body is injection molded.

16. The air mattress of claim 11, further comprising a mesh web that is attached to two or more of the plurality of top surface connection points and two or more of the plurality of bottom surface connection points.

17. The air mattress of claim 11, wherein the hollow structure comprises a plurality of flexible sheets.

18. The air mattress of claim 12, wherein when a downward force on the valve assembly exceeds an outward force exerted on the diaphragm valve of the valve assembly by the compression spring, and wherein when an inward force of atmospheric air pressure acting on the valve assembly exceeds an outward force exerted on the diaphragm valve of the valve assembly by air pressure internal to the air mattress, the downward force causes the compression spring and the hollow structure to contract such that the top end cap moves toward the bottom end cap.

19. The air mattress of claim 18, wherein when the top end cap moves toward the bottom end cap, air contained in the inner cavity flows through the bellow into the interior volume of the air mattress.

20. The air mattress of claim 12, wherein when an outward force exerted on the diaphragm valve of the valve assembly by air pressure internal to the air mattress exceeds an inward force exerted on the valve assembly by atmospheric air pressure, the outward force causes the diaphragm valve to close the valve body.

21. The air mattress of claim 12, wherein when an inward force exerted on the valve assembly by atmospheric air pressure exceeds an outward force exerted on the diaphragm valve of the valve assembly by air pressure internal to the air mattress, the diaphragm valve is configured to allow air to enter the valve assembly.

22. A method of inflating an air mattress, the method comprising:

depressing a valve assembly disposed on a top surface of the air mattress and connected to a built-in air pump, the valve assembly comprising:

a valve body attached to the top surface of the air mattress, wherein the valve body comprises:

a flat flange connected to the top surface of the air mattress;

a wavy surface having a side surface, the wavy surface being connected to the flat flange at the side surface of the wavy surface;

a diaphragm valve positioned on a bottom portion of the valve body;

a valve cap configured to attach to the valve body; and a cap gasket positioned within the valve cap;

applying a downward force to the built-in air pump by exceeding an outward force of air pressure exerted on the valve assembly, the built-in air pump comprising:

a hollow structure defining an inner cavity between the top surface and a bottom surface of the air mattress, the top surface comprising a plurality of top surface connection points and the bottom surface comprising a plurality of bottom surface connection points;

a compression spring located within the inner cavity and attached to the top surface and the bottom surface;

a bellow connected to a side surface of the hollow structure, the bellow providing an air pathway from the inner cavity to an interior volume of the air mattress;

a top end cap attached to a top portion of the compression spring and abutting the top surface; and a bottom end cap attached to a bottom portion of the compression spring and abutting the bottom surface;

contracting the compression spring and the hollow structure allowing the top end cap to move toward the bottom end cap; and pushing air contained in the inner cavity through the bellow and into the interior volume due to the contracting.

23. The method of claim 22, wherein when the outward force of air pressure pushes the diaphragm valve into the valve body to seal the valve body when the air mattress is inflated.

24. The method of claim 22, wherein applying the downward force further comprises exceeding an outward force of the compression spring.

25. The method of claim 22, wherein the valve body is injection molded.

26. The method of claim 22, further comprising a mesh web that is attached to two or more of the plurality of top surface connection points and two or more of the plurality of bottom surface connection points.

27. The method of claim 22, wherein the hollow structure comprises a plurality of flexible sheets.

* * * * *